(12) United States Patent
Suzuki et al.

(10) Patent No.: US 8,455,089 B2
(45) Date of Patent: Jun. 4, 2013

(54) PREFORM FOR MOLDING FIBER-REINFORCED RESIN BEAM

(75) Inventors: Tamotsu Suzuki, Otsu (JP); Tomoyuki Shinoda, Nagoya (JP); Haruhiko Tsuji, Otsu (JP)

(73) Assignee: Toray Industries, Inc., Tokyo (JP)

( * ) Notice: Subject to any disclaimer, the term of this patent is extended or adjusted under 35 U.S.C. 154(b) by 933 days.

(21) Appl. No.: 12/524,241

(22) PCT Filed: Jan. 23, 2008

(86) PCT No.: PCT/JP2008/050864
§ 371 (c)(1),
(2), (4) Date: Jul. 23, 2009

(87) PCT Pub. No.: WO2008/090911
PCT Pub. Date: Jul. 31, 2008

(65) Prior Publication Data
US 2010/0080952 A1  Apr. 1, 2010

(30) Foreign Application Priority Data
Jan. 26, 2007 (JP) .................................. 2007-016230

(51) Int. Cl.
C08J 5/04 (2006.01)
B32B 27/04 (2006.01)
B32B 27/12 (2006.01)
B32B 7/12 (2006.01)

(52) U.S. Cl.
USPC .................. 428/297.4; 428/317.1; 428/317.3

(58) Field of Classification Search
USPC .............. 428/40.1, 35.7, 36.1–36.4, 68, 221, 428/292.1, 292.7, 297.4, 317.1, 317.3
See application file for complete search history.

(56) References Cited

U.S. PATENT DOCUMENTS
4,596,835 A * 6/1986 Werner et al. ................. 521/122

FOREIGN PATENT DOCUMENTS

| JP | 02-102029 | | 4/1990 |
|---|---|---|---|
| JP | 09-216959 | | 8/1997 |
| JP | 2004143226 A | * | 5/2004 |
| JP | 2005-246771 | | 9/2005 |
| JP | 2005-324513 | | 11/2005 |
| JP | 2007-001298 | | 1/2007 |
| JP | 2007-008147 | | 1/2007 |

OTHER PUBLICATIONS

Machine translation of JP 2007-001298A, Jan. 11, 2007.*
International Search Report dated Mar. 4, 2008, application No. PCT/JP2008/050864.

* cited by examiner

Primary Examiner — Patricia Nordmeyer
(74) Attorney, Agent, or Firm — RatnerPrestia

(57) ABSTRACT

A preform for the molding of a fiber-reinforced resin beam includes a reinforcing-fiber beam which has been formed from a reinforcing-fiber base made up of many reinforcing fibers and has a cross-sectional shape with at least one linear part and at least one curved part connected to the linear part; and a release sheet bonded and united through an adhesive resin to at least part of a surface of the reinforcing-fiber base along the lengthwise direction for the base. A process for producing a preform includes shaping a continuous flat reinforcing-fiber base having a release sheet bonded and united to a surface thereof so that the cross-sectional shape of the base has a curved part to thereby produce a preshaped object; and bonding and uniting the preshaped object to another preshaped object.

13 Claims, 9 Drawing Sheets

PREFORM FOR MOLDING FIBER-REINFORCED RESIN BEAM

This application is a U.S. National Phase Application of PCT International Application No. PCT/JP2008/050864, filed Jan. 23, 2008, which claims priority to Japanese Patent Application No. 2007-016230, filed Jan. 26, 2007, the contents of both applications being incorporated by reference herein in their entirety.

FIELD OF THE INVENTION

The present invention relates to a preform for molding a fiber-reinforced resin beam, a process for producing the same, an apparatus for producing the same, and a process for producing a fiber-reinforced resin beam. The preform of the invention for molding a fiber-reinforced resin beam is preferably used when a fiber-reinforced resin beam is produced using a matrix resin by a resin transfer molding method.

BACKGROUND OF THE INVENTION

A fiber reinforced resin molded object comprising reinforcing fibers such as carbon fiber, glass fiber or aramid fiber and a resin is, since it is light and has a high durability, used as various structural members, such as, of car and aircraft.

As methods for molding the fiber reinforced resin molded object, for example, an autoclave molding method in which a laminate made by laminating prepreg sheets, which are reinforcing fiber sheets impregnated with a resin, are pressed and heated in an autoclave to cure the resin is generally employed.

However, in the autoclave molding method in which the prepreg sheet is used, there has been a problem that a complicated three-dimensionally shaped molded object is difficult to be molded. And, since materials cost is too high and molding time is too long, there has been a problem that production cost of the molded object becomes high. For that reason, it is the present condition that application and use of the molded object made by the autoclave molding method in which the prepreg sheet is used has not been widespread.

On the other hand, as a molding method of fiber reinforced resin molded object for solving the above-mentioned problem of the autoclave molding method, there is a resin transfer molding method (RTM method) in which a matrix resin is injected and impregnated to spaces in reinforcing fiber base (dry reinforcing fiber base) to which no matrix resin is deposited. In this resin transfer molding method, there is also a vacuum resin transfer molding method (vacuum RTM method) in which, at injection of the matrix resin, atmosphere is maintained vacuum.

In the resin transfer molding method, in general, a laminate made by laminating plural dry reinforcing fiber cloths is arranged in a mold, and by injecting a low viscosity liquid matrix resin to the laminate to impregnate the laminate with the matrix resin, and after that, by heating it by an oven or the like to cure the matrix resin, a fiber reinforced resin molded object (so-called composite material) is molded.

In this way, in the resin transfer molding method, since a dry reinforcing fiber base is used, it becomes possible to shape the reinforcing fiber base along a complicated three-dimensional shape. However, by only simply placing a necessary number of the reinforcing fiber cloths in the mold by laying on the other in turn, it is difficult to produce a composite material in which reinforcing fiber cloth has no significant wrinkles and the reinforcing fibers distribute nearly uniformly, and in addition, having a high fiber volume fraction Vf (volume percentage occupied by reinforcing fiber in total volume of molded object).

As a method for solving this problem, a method employing a preform in which a laminate made by laminating plural dry reinforcing fiber cloths is, in consideration of shape of molded object to be molded, preshaped according to the shape, is prepared and molded into a molded object by using it. However, this work for preparing the preform and quality of the preform bring about a great influence to production cost and quality of the composite material.

Furthermore, in order to inject and impregnate the matrix resin into the preform, it is necessary to arrange resin diffusion media (generally, referred to as media material) on a surface of the preform to diffuse the matrix resin, and in addition, in order to prevent an integration of the media material to a molded article, it is necessary to arrange a release material (release sheet) between the preform and the media material.

However, since the release material is, generally, a cloth such as of polyamide or polyester fiber, and media material is, generally, a net-like material (mesh) formed by such as polyamide, by only simply placing these materials at a desired position on a surface of the preform, these are difficult to be fixed at the position. For that reason, at arranging the preform in the mold, some fixing means, in most cases, fixing work by hand of these materials to a surface of the preform inserted in the mold by using an adhesive tape, has been considered to be necessary.

In particular, in order to arrange and fix the release material to a surface of the preform of complicated shape having a bent portion or branch portion in cross-sectional shape, there has been a problem that considerable work is required, and cost merit of the resin transfer molding method is counteracted.

After the molding of fiber reinforced resin molded object in the mold is completed, it is necessary to peel off the release material deposited to the surface of the molded object from the surface of molded object. For that purpose, in most cases, the release material is formed with a material of which thickness is small, not having good adhesive properties, and in addition, which is slippery. In a release material constituted with such a material, it becomes still more difficult to arrange it to a surface of a preform, and for arranging work, carefulness and delicate sensitivity are demanded.

In addition, since the release material is, as the above-mentioned, generally, a woven fabric such as of polyamide or polyester fiber, is poor in stretchability, there was a problem that, unless it is tightly arranged along the shape of preform, when the mold is pushed against the preform, a wrinkle is generated in the release material or a tension of the release material at position of bent portion of the preform is generated, and the mold cannot be pushed against a predetermined position, and the matrix resin is collected in the gap generated between the release material and the preform to form a resin rich portion, and quality of resin molded object formed is deteriorated.

Among these problems, apparatus for continuously producing preform for molding fiber-reinforced resin beam in which reduction of work at preform preparation step is aimed, is proposed (refer to Patent Literature 1). This apparatus for continuously producing preform is an apparatus in which, in a step of conveying two sheet-like continuous reinforcing fiber cloths, they are bent such that the respective cross-sectional shapes are U-shaped, and in addition, in back-to-back configuration, respective bottoms of the U-shape are laminated and bonded with each other, to continuously produce a preform.

However, the apparatus of this proposal is an apparatus only to produce a preform by arranging a reinforcing fiber base into a preform shape. Accordingly, this proposal teaches nothing about an idea relating to production cost from storing this preform into a mold and up to impregnating the stored preform with a matrix resin to mold a composite material, and to an arrangement of release material which affects greatly to quality of the produced composite material. This proposal cannot be said to be sufficient for a requirement to produce a low cost and high quality composite material which is ultimately desired.

Patent Literature 1: JP-2005-324513A

SUMMARY OF INVENTION

The invention provides a preform for molding a fiber-reinforced resin beam which can preferably be used in case where a fiber-reinforced resin beam is produced by a resin transfer molding method, and in which the above-mentioned problems of conventional art are solved.

The invention also provides a production method and an apparatus for producing such a preform for molding a fiber-reinforced resin beam.

The invention also provides a production method of a fiber-reinforced resin beam in which the preform for molding a fiber-reinforced resin beam is used.

A preform for molding a fiber-reinforced resin beam according to exemplary embodiments of the invention provides the following.

A preform for molding a fiber-reinforced resin beam comprising a reinforcing fiber beam which is formed from a reinforcing fiber base comprising many reinforcing fibers and has a cross-sectional shape comprising at least one linear portion and at least one bent portion connected to the linear portion and a release sheet bonded and integrated by an adhesive resin to at least a part of a surface of the reinforcing fiber base along the lengthwise direction of the reinforcing fiber base, wherein the reinforcing fiber base has matrix-resin-receiving spaces therein and the preform has a matrix-resin-flowing part connected to the matrix-resin-receiving spaces on at least a part of a surface of the preform.

The release sheet may be provided on the surfaces except end surfaces of thickness direction of the reinforcing fiber base, or on the entire surface including the end surfaces.

It is preferable that a volume fraction Vpf of the reinforcing fiber in the preform for molding a fiber-reinforced resin beam is 45 to 65%.

It is preferable that the reinforcing fiber base is made of a reinforcing fiber cloth.

It is preferable that the fiber base is made of a laminate of the plural reinforcing fiber cloths bonded with each other by an adhesive resin.

The reinforcing fiber base may have a ply drop portion in which number of plies of the reinforcing fiber cloth decreases.

The height in cross-sectional shape of the reinforcing fiber beam may vary along its lengthwise direction.

It is preferable that the release sheet is made of a polyester fiber cloth.

The reinforcing fiber beam may have at least two bent portions and by positioning these two bent portions back-to-back with each other, a branch portion of the reinforcing fiber base may be formed in cross-sectional shape of the reinforcing fiber beam.

The fiber base is optionally made of a reinforcing fiber cloth and the fiber beam optionally has at least two bent portions, and by positioning these two bent portions back-to-back with each other, a branch portion of the reinforcing fiber base is formed in cross-sectional shape of the reinforcing fiber beam, and the release sheet is provided on one part of a surface of the reinforcing fiber base, and the other part of the surface of the reinforcing fiber base may be exposed on a surface of the preform.

The fiber base is optionally made of a reinforcing fiber cloth, and the reinforcing fiber beam optionally has at least two bent portions, and a branch portion of the reinforcing fiber base is formed in cross-sectional shape of the reinforcing fiber beam by positioning these two bent portions back-to-back with each other, and the release sheet may be provided on the surfaces except end surfaces of thickness direction of the reinforcing fiber base, or on the entire surface including the end surfaces.

The cross-sectional shape of the reinforcing fiber beam may be T-shaped, I-shaped, H-shaped or J-shaped.

The cross-sectional shape of the reinforcing fiber beam may be L-shaped, Z-shaped, C-shaped or hat-shaped.

A production method of a preform for molding a fiber-reinforced resin beam in an embodiment of the present invention is as follows.

A production method of a preform for molding a fiber-reinforced resin beam comprising the steps of:

(a) a reinforcing fiber base supply step for supplying a reinforcing fiber base comprising many reinforcing fibers, having therein matrix-resin-receiving spaces and being deposited with an adhesive resin on a surface thereof, to a position for processing, (b) a release sheet supply step for supplying a release sheet to the position for processing, (c) a release sheet lamination step for laminating the release sheet supplied, at the position for processing, to at least a part of a surface of the supplied reinforcing fiber base along the lengthwise direction thereof, (d) a release sheet bonding step for bonding and integrating the release sheet to the surface of the reinforcing fiber base, by the adhesive resin, by heating and pressing the reinforcing fiber base and the release sheet laminated on the surface of the reinforcing fiber base, and, (e) a shaping step for molding a preform for molding a fiber-reinforced resin beam having a cross-sectional shape comprising at least one linear portion and at least one bent portion connected to the linear portion, by heating and/or pressing, by using a shaping mold, the reinforcing fiber base to which the release sheet is bonded and integrated.

In the release sheet lamination step, the release sheet may be laminated on the surfaces except end surfaces of thickness direction of the reinforcing fiber base or on the entire surface including the end surfaces.

It is preferable that a volume fraction Vpf of the reinforcing fiber in the preform for molding a fiber-reinforced resin beam is 45 to 65%.

It is preferable that the reinforcing fiber base used in the reinforcing fiber base supply step is made of a reinforcing fiber cloth.

It is preferable that the reinforcing fiber base used in the reinforcing fiber base supply step is made of a laminate of the plural reinforcing fiber cloths bonded with each other by an adhesive resin.

It is preferable that the release sheet used in the release sheet supply step is made of a polyester fiber cloth.

In the production method of the preform for molding a fiber-reinforced resin beam in an embodiment of the present invention, it is preferable that, (a) the reinforcing fiber base in the reinforcing fiber base supply step is a continuous reinforcing fiber base sheet, and the reinforcing fiber base supply step is an intermittent reinforcing fiber base sheet supply step comprising a supply time zone in which the continuous reinforcing fiber base sheet is continuously supplied up to a predetermined length to be processed to the position for processing and a non-supply time zone in which the supply is stopped after the predetermined length is supplied, (b) the release sheet in the release sheet supply step is a continuous release sheet, and the release sheet supply step is an intermittent release sheet supply step comprising a supply time zone in which the continuous release sheet is continuously supplied up to a predetermined length to be processed to the position for processing and a non-supply time zone in which the supply is stopped after the predetermined length is supplied, and wherein (c) the supply of the reinforcing fiber base sheet in the intermittent reinforcing fiber base sheet supply step and the supply of the release sheet in the intermittent release sheet supply step are carried out intermittently at least two times, and synchronously with each other.

In the production method of the preform for molding a fiber-reinforced resin beam in an embodiment of the present invention, it is preferable that, (a) the supply of the reinforcing fiber base sheet in the intermittent reinforcing fiber base sheet supply step is carried out by plural reinforcing fiber base sheet feeding lines independent with each other, (b) the supply of the release sheet in the intermittent release sheet supply step is carried out by one release sheet feeding line commonly used in correspondence to the plural reinforcing fiber base sheet feeding lines, or by plural release sheet feeding lines independent with each other, (c) the lamination in the release sheet lamination step of the plural reinforcing fiber base sheets supplied from the plural reinforcing fiber base sheet feeding lines and the release sheets supplied from the release sheet feeding line is carried out by plural release sheet lamination lines independent with each other, (d) an integration of the reinforcing fiber base sheet and the release sheet in the release sheet bonding step is carried out by plural release sheet bonding lines independent with each other corresponding to the plural release sheet lamination lines, and wherein (e) the shaping step comprises, (e-1) a first preshaping step for preshaping, in the plural release sheet bonding lines, by heating and/or pressing at least one reinforcing fiber base sheet with release sheet among the reinforcing fiber base sheets with release sheet which are independent with each other by being integrated respectively and separately the reinforcing fiber base sheet and the release sheet, by using a shaping mold such that a cross-sectional shape comprising at least one linear portion and at least one bent portion connected to the linear portion is formed, (e-2) a second preshaping step for preshaping the remaining reinforcing fiber base sheets with release sheet, by heating and/or pressing by using a shaping mold, (e-3) a preshaped object bonding step in which the first preshaped object obtained in the first preshaping step and the second preshaped object obtained in the second preshaping step are bonded and integrated.

In the production method of the preform for molding a fiber-reinforced resin beam in an embodiment of the present invention, it is preferable that, (a) the plural reinforcing fiber base sheet feeding lines comprise a first reinforcing fiber base sheet feeding line, a second reinforcing fiber base sheet feeding line and a third reinforcing fiber base sheet feeding line, and the first continuous reinforcing fiber base sheet is supplied from the first reinforcing fiber base sheet feeding line, the second continuous reinforcing fiber base sheet is supplied from the second reinforcing fiber base sheet feeding line, and the third continuous reinforcing fiber base sheet is supplied from the third reinforcing fiber base sheet feeding line, (b) for the first reinforcing fiber base sheet feeding line and the second reinforcing fiber base sheet feeding line, a first release sheet feeding line is prepared which supplies a first release sheet, (c) in the release sheet lamination step, the first release sheet is laminated to the first reinforcing fiber base sheet and the second reinforcing fiber base sheet on surfaces of same one side thereof, (d) in the release sheet bonding step, the first release sheet is bonded and integrated with the first reinforcing fiber base sheet and the second reinforcing fiber base sheet to form a first reinforcing fiber base sheet with the release sheet, (e) in the first preshaping step, the first reinforcing fiber base sheet with the release sheet is shaped in T-shape in a manner in which the bent portion of the first reinforcing fiber base sheet and the bent portion of the second reinforcing fiber base sheet of the first reinforcing fiber base sheet with the release sheet are arranged back-to-back, and in addition, in a state in which the first release sheet locates on the inner curved surface of the bent portion, to form a first preshaped object of T-shaped cross-sectional shape, (f) in the second preshaping step, the third reinforcing fiber base sheet is shaped into a flat plate, to form a flat-plate second preshaped object, (g) in the preshaped object bonding step, the top portion surface of the T-shaped first preshaped object on which the first release sheet is not present and the bottom surface of the flat-plate second preshaped object are bonded and integrated.

In this embodiment, it may be processed such that the second release sheet feeding line for supplying the second release sheet is prepared for the third reinforcing fiber base sheet feeding line and, in the release sheet lamination step, the second release sheet is laminated to the third reinforcing fiber base sheet on one side surface positioned at opposite side to the surface on which the first release sheet is laminated and, in the release sheet bonding step, the second release sheet is bonded and integrated to the third reinforcing fiber base sheet to form a second reinforcing fiber base sheet with the release sheet and, in the second preshaping step, the second reinforcing fiber base sheet with the release sheet is shaped into a flat plate to form a flat-plate second preshaped object and, in the preshaped object bonding step, the top portion surface of the T-shaped first preshaped object on which the first release sheet is not present and the bottom surface of the flat-plate second preshaped object on which the second release sheet is not present are bonded and integrated.

In the production method of the preform for molding a fiber-reinforced resin beam in an embodiment of the present invention, in formation of the second preshaped object, any one of the release sheet bonding step and the second preshaping step may be omitted, and by the remaining steps, the processing or treatment to the reinforcing fiber base sheet and the release sheet in the respective steps may be carried out.

In the production method of the preform for molding a fiber-reinforced resin beam of an embodiment of the present invention, in order to fill the gap, formed between the top portion surface and the bottom surface of the flat-plate in the preform for molding a fiber-reinforced resin beam formed by bonding and integrating the top portion surface of the T-shaped first preshaped object and the bottom surface of the flat-plate second preshaped object, a linear continuous filler may be supplied to the gap synchronously with the intermittent supply of the reinforcing fiber base sheet.

An apparatus for producing a preform for molding a fiber-reinforced resin beam in an embodiment of the present invention is as follows.

An apparatus for producing a preform for molding a fiber-reinforced resin beam which comprises (a) a reinforcing fiber base supply apparatus for supplying a reinforcing fiber base, comprising many reinforcing fibers and having therein matrix-resin-receiving spaces and deposited with an adhesive resin on a surface thereof, to a position for processing, (b) a release sheet supply apparatus for supplying a release sheet to the position for processing, (c) a release sheet lamination apparatus for laminating the supplied release sheet, at the position for processing, to at least a part of a surface of the reinforcing fiber base along the lengthwise direction thereof, (d) a release sheet bonding apparatus for bonding and integrating the release sheet to the surface of the reinforcing fiber base by the adhesive resin by heating and pressing the reinforcing fiber base and the release sheet laminated on the surface of the reinforcing fiber base, and (e) a shaping apparatus for molding a preform for molding a fiber-reinforced resin beam having a cross-sectional shape comprising at least one linear portion and at least one bent portion connected to the linear portion by heating and/or pressing the reinforcing fiber base to which the release sheet is bonded and integrated by using a shaping mold.

A production method of the fiber-reinforced resin beam of an embodiment of the present invention is as follows.

A production method of a fiber-reinforced resin beam comprising the steps of:

(a) a step for arranging a preform for molding a fiber-reinforced resin beam in a mold for molding a fiber-reinforced resin beam, in a state in which a release sheet bonded and integrated to the preform for molding a fiber-reinforced resin beam as set forth in claim 1 is facing to molding surface of the mold, and, (b) a step for arranging a resin diffusion media between a matrix resin inlet of the mold and a surface of the preform for molding a fiber-reinforced resin beam located in the resin inlet side, and, (c) a step for injecting a matrix resin from the matrix resin inlet, via the resin diffusion media, into the matrix-resin-receiving spaces of the preform for molding a fiber-reinforced resin beam, and (d) a step for taking out the preform for molding a fiber-reinforced resin beam impregnated with the matrix resin from the mold.

ADVANTAGEOUS EFFECTS INVENTION

According to an embodiment of the present invention, a preform in which a release sheet is bonded and integrated to a dry reinforcing fiber base by an adhesive resin is provided. By using this preform in a resin transfer molding method, work for individually arranging release sheet in a mold is greatly reduced, and in addition, since the release sheet is tightly bonded and integrated to a shape of the preform, a resin rich portion which has been generated by a matrix resin being stored in a gap conventionally generated between the release sheet and the preform is prevented.

As a result, a fiber-reinforced resin beam molded by using the preform of embodiments of the present invention has a good quality. This fiber-reinforced resin beam is preferably used as, for example, various structural members for car or various structural members for aircraft (e.g., stringer or spar).

In addition, in case where it is necessary to adjust a shape of the preform in an embodiment of the present invention by trimming, since a release sheet is bonded and integrated to a surface of the reinforcing fiber base, fuzz at the trimming of the reinforcing fiber with which the reinforcing fiber base is formed is prevented.

Figure 1:
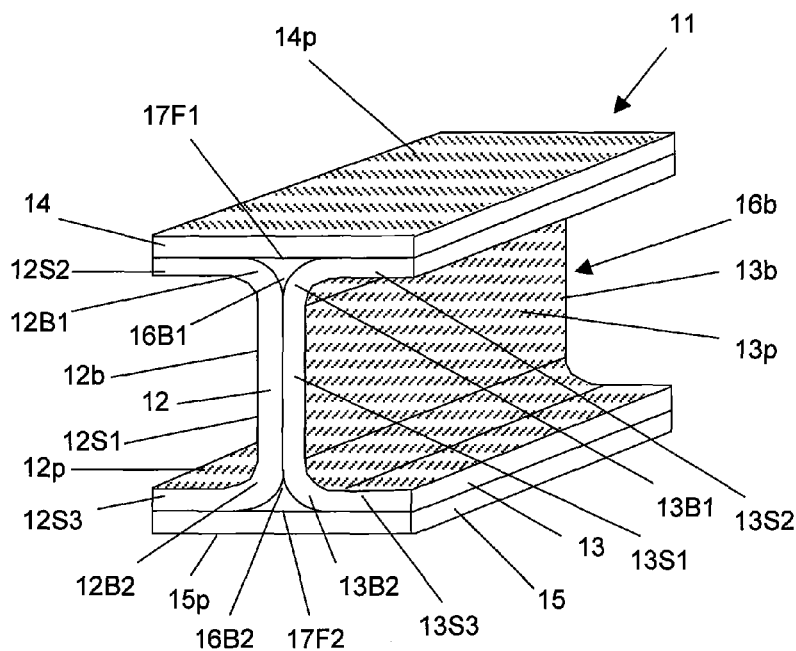
FIG. 1 is a perspective view of an example of the preform for molding a fiber-reinforced resin beam in an embodiment of the present invention.

REFERENCE SIGNS LIST 11, 11a: preform in an embodiment of the present invention
12: reinforcing fiber base comprising many reinforcing fibers
12B1, 12B2: bent portion
12S1: linear portion (vertical portion) (web portion)
12S2, 12S3: linear portion (horizontal portion) (flange portion)
12b: reinforcing fiber beam
12p, 12pS: release sheet
13: reinforcing fiber base comprising many reinforcing fibers
13B1, 13B2: bent portion
13S1: linear portion (vertical portion) (web portion)
13S2, 13S3: linear portion (horizontal portion) (flange portion)
13b: reinforcing fiber beam
13f: reinforcing fiber cloth
13p, 13pS: release sheet
14: reinforcing fiber base comprising many reinforcing fibers
14p: release sheet
15: reinforcing fiber base comprising many reinforcing fibers
15p: release sheet
16B1, 16B2: branch portion
16b: reinforcing fiber beam
17F1, 17F2: filler
21a: L-shaped beam
21b: Z-shaped beam
21c: C-shaped beam
21d: hat-shaped beam
21e: T-shaped beam
21f: I-shaped beam
21g: H-shaped beam
21h: J-shaped beam
31: molding apparatus
32: apparatus base
33: preform-holding space
34a, 34b: matrix resin injection port
35a, 35b: mold
36a, 36b: mold
37: gap
38: vacuum suction port
39a, 39b, 39c: resin diffusion media
40: bagging film
41a, 41b: sealant
51: conventional preform
52p: release sheet
53p: release sheet
54p: release sheet
55p: release sheet
55LC1, 55LC2, 55RC1, 55RC2: bent portion
59a, 59b, 59c: resin diffusion media
61: molding apparatus (co-bonding method)
71: panel material
71p: release sheet
81: release sheet bonding apparatus
81a: flat press
82: bottom mold
83: top mold
84: release sheet
85: reinforcing fiber base
91: release sheet bonding apparatus
92: bottom mold
93: top mold
93a: protrusion (indentor)
94: release sheet
95: reinforcing fiber base
96: release sheet bonding apparatus
97: bottom mold
98: top mold
98a: flat portion of protrusion
99: release sheet
100: reinforcing fiber base
101: shaping apparatus
102: bottom mold
103: top mold
103a: concave groove
104a: right side mold
104b: left side mold
111: preshaped object bonding apparatus
112: bottom mold
113a: right side mold
113b: left side mold
114: top mold
120: lower side preshaped object
121a: right side preshaped object
121b: left side preshaped object
122: upper side preshaped object
131: preform in an embodiment of the present invention
132a: upper side flange portion
132b: lower side flange portion
133a: ply drop
133b: ply drop
135: starting point of ply drop
136: ending point of ply drop
133s: slope
141: apparatus for producing preform
142A, 142B, 142C, 142D: molding line
143: preform take-up line
144A, 144B, 144C, 144D: release sheet bonding apparatus
145A, 145B, 145C, 145D: shaping apparatus 146A: flat-plate preform
146B: C-shaped preform
146C: C-shaped preform
146D: flat-plate preform
147A, 147B, 147C, 147D: preshaped object
148: preshaped object bonding apparatus
152: preform in an embodiment of the present invention
161A, 161B: filler
162A, 162B: filler feeding line
171: trimming apparatus
172a, 172b: upper trimming blade
172c, 172d: lower trimming blade
176: trimming apparatus
177a, 177b: upper trimming blade
177c, 177d: lower trimming blade
178a, 178b: tapered portion
201: apparatus for producing preform
203: preform take-up line
202A, 202B: molding line
204A: shaping apparatus
204B: release sheet bonding apparatus
205B: shaping apparatus
206A: flat-plate preform
206B: T-shaped preform
207A: flat-plate preshaped object
207B: T-shaped preshaped object
208: preshaped object bonding apparatus
211Bf1, 211Bf2: reinforcing fiber base sheet
211Bp: one broad release sheet
212: preform in an embodiment of the present invention
221: filler
222: filler feeding line
300: gap
302: right side mold
303: left side mold
304: widening roll
305: concave portion
307: right side mold
308: left side mold
309: top mold
310: gap portion

DETAILED DESCRIPTION OF THE INVENTION

A preform for molding a fiber-reinforced resin beam in an embodiment of the present invention (hereafter, may simply be referred to as a preform of the present invention) is constituted with a reinforcing fiber beam which has been formed from a reinforcing fiber base comprising many reinforcing fibers and has a cross-sectional shape comprising at least one linear portion and at least one bent portion connected to the linear portion and a release sheet bonded and integrated to at least a part of a surface of the reinforcing fiber base along its lengthwise direction by an adhesive resin.

One of the characteristics of the preform in embodiments of the present invention is that, in a state before arranging in a mold for molding into a resin molded object by using a matrix resin, that is, in a state outside the mold, the release sheet is bonded and integrated to the reinforcing fiber base by the adhesive resin.

By using FIG. 1, one example of the preform in an embodiment of the present invention is explained. A preform 11 of the invention shown in FIG. 1 is an example of a preform of which cross-sectional shape is I-shaped.

In FIG. 1, the preform 11 is formed with a reinforcing fiber base 12 comprising many reinforcing fibers, a reinforcing fiber base 13 comprising many reinforcing fibers, a reinforcing fiber base 14 comprising many reinforcing fibers, and a reinforcing fiber base 15 comprising many reinforcing fibers. The respective reinforcing fiber bases has, in its inside, matrix-resin-receiving spaces formed by spaces existing between the many reinforcing fibers.

To one side surface (a surface forming outer surface of the preform 11) of the respective reinforcing fiber bases, over the entire surface, release sheets 12p, 13p, 14p and 15p are bonded and integrated by an adhesive resin. The respective release sheets have a matrix-resin-flowing part connected to matrix-resin-receiving spaces of the reinforcing fiber base.

The reinforcing fiber base 12, of which cross-sectional shape is C-shaped, has two bent portions 12B1 and 12B2. One end of the bent portion 12B1 is connected to a linear portion (vertical portion) 12S1 and the other end is connected to a linear portion (horizontal portion) 12S2, and, one end of the bent portion 12B2 is connected to the linear portion (vertical portion) 12S1 and the other end is connected to a linear portion (horizontal portion) 12S3, to form a reinforcing fiber beam 12b.

The reinforcing fiber base 13, of which cross-sectional shape is C-shaped, has two bent portions 13B1 and 13B2. One end of the bent portion 13B1 is connected to a linear portion (vertical portion) 13S1 and the other end is connected to a linear portion (horizontal portion) 13S2, and, one end of the bent portion 13B2 is connected to the linear portion (vertical portion) 13S1 and the other end is connected to a linear portion (horizontal portion) 13S3, to form a reinforcing fiber beam 13b.

The C-shape of the cross-sectional shape of the reinforcing fiber base 12 and the C-shape of the cross-sectional shape of the reinforcing fiber base 13 are opposite in their directions, and at the linear portion (vertical portion) 12S1 and the linear portion (vertical portion) 13S1, they are positioned back-to-back with each other, and are bonded and integrated with each other by an adhesive resin.

The reinforcing fiber base 14 and the reinforcing fiber base 15 are respectively made of a flat-plate reinforcing fiber base. Lower surface of the reinforcing fiber base 14 is bonded and integrated by an adhesive resin to the upper surface of the reinforcing fiber base 12 (the linear portion (horizontal portion) 12S2) and the upper surface of the reinforcing fiber base 13 (the linear portion (horizontal portion) 13S2).

A reinforcing fiber beam 16b, in which the reinforcing fiber beam 12b and the reinforcing fiber beam 13b are bonded and integrated back-to-back, has a branch portion 16B1 in the upper side and a branch portion 16B2 in lower side. In a gap formed between the upper surface of the branch portion 1681 and the lower surface of the reinforcing fiber base 14, as required, a filler 17F1 is inserted. Similarly, in a gap formed between the lower surface of the branch portion 16B2 and the upper surface of the reinforcing fiber base 15, as required, a filler 17F2 is inserted.

The linear portion (vertical portion) 12S1 of the reinforcing fiber beam 12b is, usually, referred to as a web portion. The linear portion (horizontal portion) 12S2 of the reinforcing fiber beam 12b is, usually, referred to as a flange portion. Similarly, the linear portion (horizontal portion) 12S3 of the reinforcing fiber beam 12b is, usually, referred to as a flange portion. As to the linear portion (vertical portion) 13S1, the linear portion (horizontal portion) 13S2 and the linear portion (horizontal portion) 13S3 of the reinforcing fiber beam 13b, they are referred to in the same way, respectively.

In the preform 11 of which cross-sectional shape is I-shaped, the upper and lower horizontal portions are, usually, referred to as a flange portion, the vertical portion between the upper and lower horizontal portions is, usually, referred to as a web portion. The preform 11 has, for example, a width, height and length suitable for a fiber-reinforced resin beam of a desired size for use of structural members of an aircraft or car.

Figure 2:
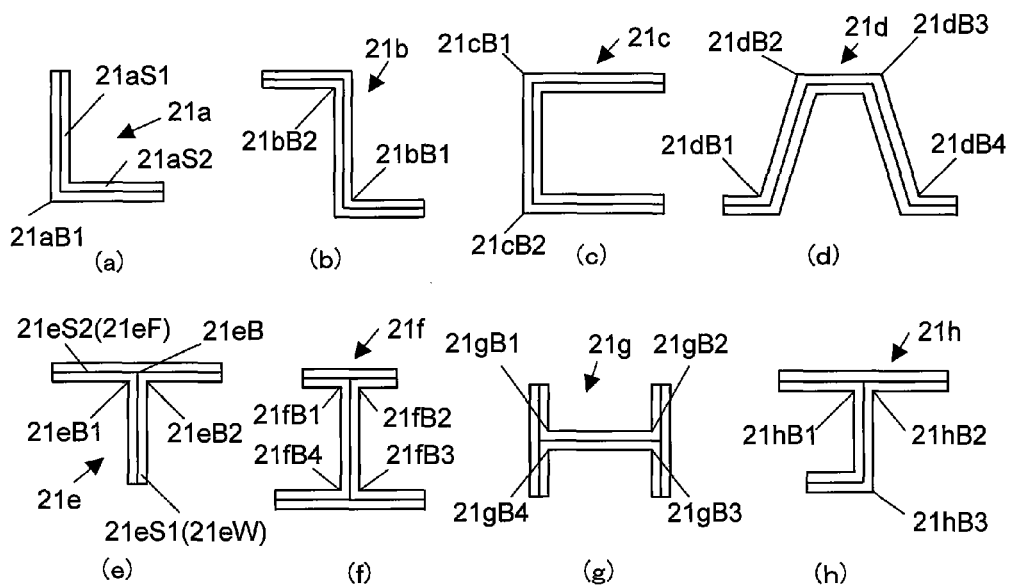
FIG. 2 is an enumeration of respective cross-sectional views of eight examples of cross-sectional shape of a reinforcing fiber beam used in the preform for molding a fiber-reinforced resin beam in embodiments of the present invention.

In FIG. 2, eight examples of a cross-sectional shape of the reinforcing fiber beam of the preform for molding a fiber-reinforced resin beam of the invention are shown. In FIG. 2(a), a beam 21a of which cross-sectional shape is L-shaped is shown. The beam 21a has a bent portion 21aB1, a linear portion (vertical portion) 21aS1 connected to one end of the bent portion and a linear portion (horizontal portion) 21aS2 connected to the other end of the bent portion.

In FIG. 2(b), a beam 21b, of which cross-sectional shape is Z-shaped, is shown. The beam 21b has two bent portions 21bB1 and 21bB2.

In FIG. 2(c), a beam 21c, of which cross-sectional shape is C-shaped, is shown. The cross-sectional shape of beam 21c is the same as the cross-sectional shape of the reinforcing fiber beams 12b or 13b of FIG. 1, and it has two bent portions 21cB1 and 21cB2.

In FIG. 2(d), a beam 21d, of which cross-sectional shape is hat-shaped, is shown. The beam 21d has four bent portions 21dB1, 21dB2, 21dB3 and 21dB4.

In FIG. 2(e), a beam 21e, of which cross-sectional shape is T-shaped, is shown. The beam 21e has two bent portions 21eB1 and 21eB2. A linear portion (vertical portion) 21eS1 of the T-shape beam 21e is, usually, referred to as a web portion 21eW. A linear portion (horizontal portion) 21eS2 of the T-shape beam 21e is, usually, referred to as a flange portion 21eF. A position where the flange portion 21eF separates to right and left is, usually, referred to as a branch portion 21eB.

In FIG. 2(f), a beam 21f, of which cross-sectional shape is I-shaped, is shown. The cross-sectional shape of the beam 21f is the same as the cross-sectional shape of the reinforcing fiber beam 16b of FIG. 1, and it has four bent portions 21fB1, 21fB2, 21fB3 and 21fB4.

In FIG. 2(g), a beam 21g, of which cross-sectional shape is H-shaped, is shown. The beam 21g has four bent portions 21gB1, 21gB2, 21gB3 and 21gB4. This H-shaped beam 21g can be understood as the same, in its shape, as the I-shaped beam 21f of the case where it is laid.

In FIG. 2(h), a beam 21h, of which cross-sectional shape is J-shaped, is shown. The beam 21h has three bent portions 21hB1, 21hB2 and 21hB3.

In FIG. 2, similar to the T-shaped beam 21e of FIG. 2(e), although references are abbreviated in the respective figures, the I-shaped beam 21f of FIG. (f), the H-shaped beam 21g of FIG. 2(g) and the J-shaped beam 21h of FIG. 2(h) have branch portions 21fB, 21gB and 21hB in the reinforcing fiber bases which continuously extend from web portions 21fW, 21gW and 21hW to flange portions 21fF, 21gF and 21hF, via bent portions.

In FIG. 1, the reinforcing fiber beam 16b having I-shaped cross-sectional shape is shown, but each of reinforcing fiber beams shown in FIG. 2 can be used instead of the I-shaped reinforcing fiber beam 16b of FIG. 1. For that reason, reinforcing fiber beams having various cross-sectional shapes can be prepared.

Figure 3:
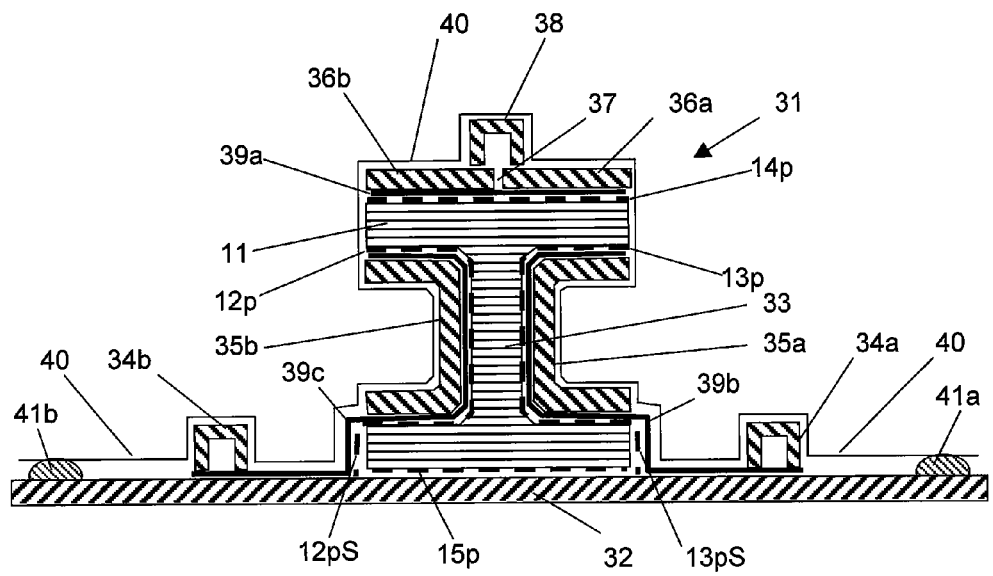
FIG. 3 is a schematic cross sectional view of a molding apparatus which explains a state in which one embodiment of the fiber-reinforced resin beam is molded by using a preform in an embodiment of the present invention having I-shaped cross-sectional shape and a matrix resin by a resin transfer molding method.

In FIG. 3, a schematic cross-sectional view of a molding apparatus used for producing a fiber-reinforced resin beam, in which the I-shaped preform shown in FIG. 1 which is an example of the preform for molding a fiber-reinforced resin beam of an embodiment of the present invention is used, is shown.

In FIG. 3, a molding apparatus 31 has an apparatus base 32 of a flat plate placed on a floor or base stand (omitted in the figure). On the upper surface of the apparatus base 32, a preform-holding space 33 extending along the lengthwise direction of the apparatus base 32 (in FIG. 3, perpendicular direction to the figure) is provided.

On the left and right sides of the preform-holding space 33, along the lengthwise direction of the apparatus base 32, a right side matrix resin injection port 34a and a left side matrix resin injection port 34b are equipped movably in the vertical direction, and as required, in the horizontal direction with respect to the upper surface of the apparatus base 32.

The molding apparatus 31 has a right side mold 35a and a left side mold 35b which are, in the horizontal direction, and as required, in the vertical direction, movably supported by the base stand, and capable to be separated from or brought into contact with the preform-holding space 33, and furthermore, has a right side upper mold 36a and a left side upper mold 36b which are, in the vertical direction, and as required, in the horizontal direction, movably supported by the base stand, and capable to be separated from or brought into contact with respect to the preform-holding space 33. The right side upper mold 36a and the left side upper mold 36b are positioned having a gap 37 through which air and a matrix resin flow.

Above the right side upper mold 36a and the left side upper mold 36b, a vacuum suction port 38 is, in the vertical direction, and as required in the horizontal direction, movably supported by the base stand, and is provided such that it is capable to be separated from or brought into contact with respect to the right side upper mold 36a and the left side upper mold 36b.

Furthermore, to the molding apparatus 31, resin diffusion medias 39a, 39b and 39c, a bagging film 40 and sealants 41a and 41b are equipped. As the resin diffusion medias (the medias), the bagging film and the sealants, commercially available products suitable for a molding condition can be used.

In the above, outline of a structure of the molding apparatus 31 was explained, but the molding apparatus 31 itself having such structure is well known and widely used in a vacuum bag molding which is one of a vacuum RTM molding.

Next, the steps for producing, by using the molding apparatus 31 of FIG. 3, a fiber-reinforced resin beam from a preform for molding the fiber-reinforced resin beam 11 in an embodiment of the present invention shown in FIG. 1, is explained.

First, the preform 11 in an embodiment of the present invention is placed on the apparatus base 32 of the molding apparatus 31 of FIG. 3, and held in the preform-holding space 33. On a surface of the preform 11, since the release sheets 12p, 13p, 14p and 15p have already been bonded and integrated with the preform 11, a manual work for separately arranging a release sheet to the surface of preform 11 after holding the preform in the preform-holding space 33 is totally unnecessary.

Next, to the surface of the preform 11 held in the preform-holding space 33, the resin diffusion medias 39a, 39b and 39c are arranged by a manual work. The lowermost part of the resin diffusion media 39b extends up to the right side matrix resin injection port 34a and the lowermost part of the resin diffusion media 39c extends up to the left side matrix resin injection port 34b, respectively. This manual arrangement of the resin diffusion media has been done in the past.

Whereas, although the release sheet 13p continuously extends to the right side surface of the lower side flange portion of the preform 11, a release sheet of the right side surface part of the lower side flange portion of the preform 11 may separately be prepared and a prepared release sheet 13pS may manually be arranged in the molding apparatus 31 without bonding and integrating to the preform 11 beforehand.

Similarly, although the release sheet 12*p* continuously extends to the left side surface of the lower side flange portion of the preform 11, a release sheet of the left side surface part of the lower side flange portion of the preform 11 may separately be prepared and a prepared release sheet 12*p*S may manually be arranged in the molding apparatus 31 without bonding and integrating to the preform 11 beforehand. However, it is preferable that the release sheet continuously extents up to the side surface part of the flange portion, in order to save the manual work.

Next, the right side mold 35*a*, the left side mold 35*b*, the right side upper mold 36*a* and the left side upper mold 36*b* are, by a moving mechanism provided to the base stand, brought into contact with the surface of the preform 11 via the resin diffusion media. After that, each mold, the right side matrix resin injection port 34*a*, the left side matrix resin injection port 34*b* and the vacuum suction port 38 are covered by the bagging film 40 such that they are intercepted from outside.

Gaps between the end portions of the bagging film 40 and the apparatus base 32 are sealed by the sealants 41*a* and 41*b*. By this step, a preparation step for injecting a matrix resin in the molding apparatus 31 is completed. This preparation step itself has been known in the past.

After completing the preparation work, by pressure reducing function inside the bagging film 40 by the vacuum suction port 38, the matrix resin is introduced from the left and right matrix resin injection ports 34*a* and 34*b*, passes the resin diffusion media and the release sheet and penetrates into matrix-resin-receiving spaces of the preform 11, to impregnate the preform 11 with the matrix resin. This resin impregnating step itself has been known in the past.

After completing the resin impregnating step, and after solidification of the matrix resin, a molded fiber-reinforced resin beam is taken out from the molding apparatus 31. This so-called demolding step has also been known in the past.

In the resin transfer molding method in which the preform in an embodiment of the present invention is used, since the release sheet has been bonded and integrated to the preform, at holding the preform into the mold, a troublesome work to separately arrange the release sheet in the molding apparatus becomes unnecessary.

In addition, since the release sheet is bonded and integrated to the preform, at arranging the resin diffusion media, the mold or other material in the molding apparatus, the release sheet does not fall down in the molding apparatus, or a position error therebetween does not occur. Accordingly, it is possible to complete, without worry and with extreme ease, injection of the matrix resin. By this way, it is possible to greatly shorten operation time.

Furthermore, when the mold is moved toward the preform side, a trouble, such that a wrinkle is generated in the release sheet or the mold cannot move to correct position due to a tension of the release sheet, does not occur. Accordingly, a generation of resin rich portion in the resin beam caused by such a trouble or a problem of lowering volume fraction (Vf) of the reinforcing fiber is prevented. As a result, it becomes possible to produce a high quality fiber-reinforced resin beam.

Figure 4:
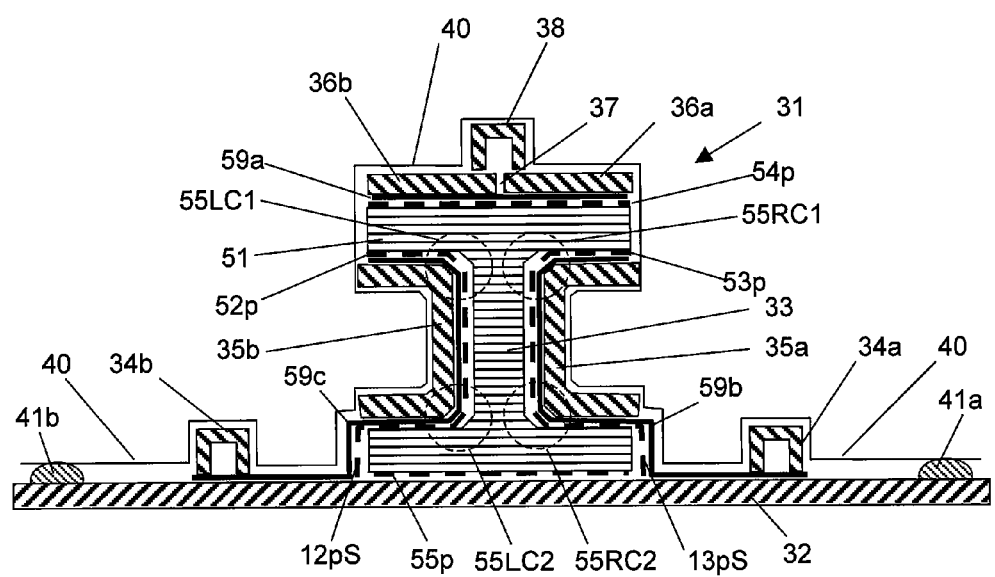
FIG. 4 is a schematic cross sectional view of a molding apparatus which explains a state in which a fiber-reinforced resin beam is molded by using a conventional preform having I-shaped cross-sectional shape and a matrix resin by a resin transfer molding method.

FIG. 4 is a schematic cross-sectional view to explain a preparation step before a matrix resin is injected into a preform, in case where a fiber-reinforced resin beam is molded by using a conventional preform 51 of which cross-sectional shape is I-shaped, by the molding apparatus 31 shown in FIG. 3. Since a molding apparatus 31 of FIG. 4 has the same structure as the molding apparatus 31 of FIG. 3, the same references as FIG. 3 are given to the respective parts of the molding apparatus.

In FIG. 4, first, a release sheet 55*p* is placed on the apparatus base 32 of the molding apparatus 31, and the conventional preform 51 is placed thereon, to be held in the preform-holding space 33. Although the conventional preform 51 is the same as the preform 11 in an embodiment of the present invention in the point that the cross-sectional shape is I-shaped, it is different in the point that the release sheet is not bonded to its surface.

Next, a release sheet 53*p* is manually arranged along a surface of C-shaped concave portion of the right side surface of the preform 51. In this case, as required, the release sheet 53*p* is temporarily fixed to a surface of the preform 51 by a fixing material such as an adhesive tape. After that, a resin diffusion media 59*b* is arranged along the outside surface of the release sheet 53*p* which has already been arranged. The lower end portion of the resin diffusion media 59*b* extends up to the right side matrix resin injection port 34*a*.

The same operation is carried out to a surface of C-shaped concave portion of the left side surface of the preform 51. That is, a release sheet 52*p* is manually arranged along the surface of C-shaped concave portion of the left side surface of the preform 51. In this case, as required, the release sheet 52*p* is temporarily fixed to a surface of the preform 51 by a fixing material such as an adhesive tape. After that, a resin diffusion media 59*c* is arranged along the outside surface of the release sheet 52*p* which has already been arranged. The lower end portion of the resin diffusion media 59*c* extends up to the left side matrix resin injection port 34*b*. Furthermore, the release sheet 54*p* is placed on the upper surface of the preform 51, and a resin diffusion media 59*a* is placed thereon.

Next, an operation to move each of the right side mold 35*a*, the left side mold 35*b*, the right side upper mold 36*a* and the left side upper mold 36*b*, toward a surface of the preform 51, by a moving mechanism provided to the base stand, is carried out. Among these moving operations, movements of the right side upper mold 36*a* and the left side upper mold 36*b* are carried out smoothly, and the release sheet 54*p* is, via the resin diffusion media 59*a*, pressed onto the upper surface of the preform 51, and arranged to desired position.

However, as to movement of the right side mold 35*a*, there occurs a problem that the movement becomes difficult or impossible before the release sheet 53*p* arrives at a desired position of the surface of the preform 51. As to movement of the left side mold 35*b*, the same problem also occurs.

As a result of studying reason of this problem, it was found that the reason is because, at bent portions 55RC1, 55RC2, 55LC1 and 55LC2, the release sheets 52*p* and 53*p* arranged beforehand becomes to a tensed state or a wrinkle in which the release sheets 52*p* and 53*p* are partially folded is generated. It was found that when the tensed state of the release sheet or the wrinkle is generated, a gap is formed between the release sheet and the preform.

In addition, in this condition, that is, in condition where the mold cannot move to the desired position, in case where the matrix resin is injected into the preform 51, it was found that the obtained fiber-reinforced resin beam has, in the bent portions 55RC1, 55RC2, 55LC1 and 55LC2, a resin rich portion formed by excessive resin remaining in the gap, and a uniform quality fiber-reinforced resin beam is not obtained. Furthermore, it was found that the density of reinforcing fibers in the web portion of the preform 51 decreases, to decrease volume fraction (Vf) of the reinforcing fiber lower than a predetermined value, and a high quality fiber-reinforced resin beam cannot be obtained.

In order to solve such a problem at least a little, in case where a conventional preform to which the release sheet is not bonded and integrated beforehand is used, it may be necessary to carry out an arrangement work of the release sheet in the molding apparatus extremely carefully. For that purpose, a lot of work and time becomes necessary. In particular, in case where a preform of which cross-sectional shape is I-shaped is used, a branch portion is present in two positions (bent portions is in four positions).

In this case, a work to arrange the release sheet, against the force of gravity, on a vertical surface of the web portion or on a horizontal lower surface of the upper flange portion becomes necessary. During or after such a work, a falling down or position error of the release sheet is easy to occur. Accordingly, the arrangement of release sheet needs, in particular, work and time.

A fiber-reinforced resin beam is, by being integrated with another panel structural member, used as a reinforcing member of the panel in many cases. The fiber-reinforced resin beam produced by the molding apparatus 31 of FIG. 3 may be bonded and integrated to a separately prepared panel material, but a bonding step therefore becomes necessary. A method for simultaneously carrying out a production of a fiber-reinforced resin beam and a bonding to a panel material without this bonding step is explained by using FIG. 5. This method is referred to as co-bonding method.

Figure 5:
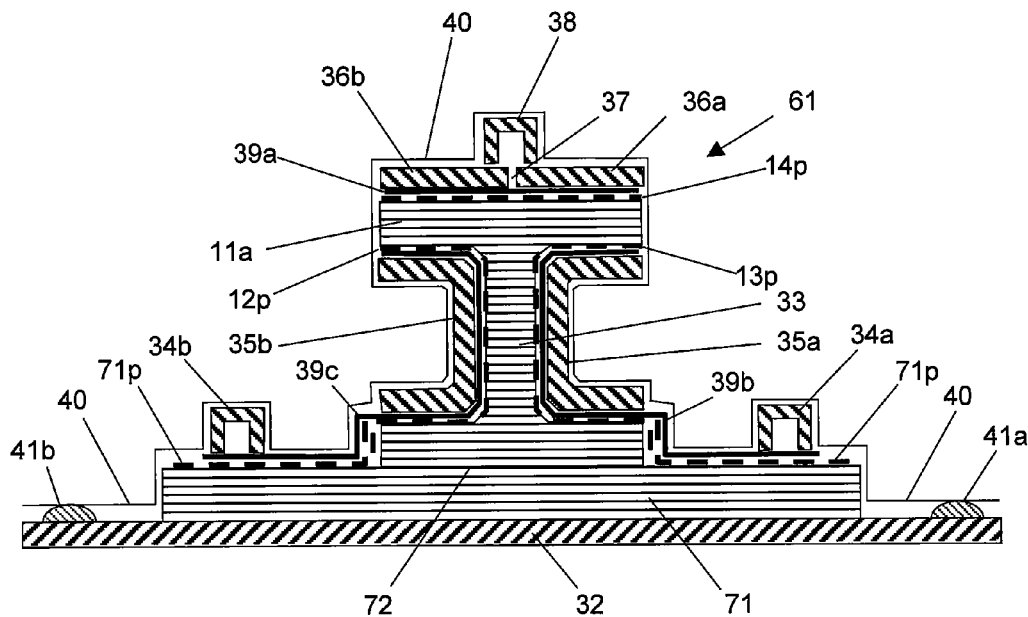
FIG. 5 is a schematic cross sectional view of a molding apparatus which explains a state in which another embodiment of the fiber-reinforced resin beam is molded by using a preform in an embodiment of the present invention having I-shaped cross-sectional shape and a matrix resin by a resin transfer molding method.

FIG. 5 is a schematic cross-sectional view of a molding apparatus 61 for carrying out the co-bonding method. A structure in apparatus of the molding apparatus 61 in FIG. 5 is the same as that of the molding apparatus 31 of FIG. 3. Accordingly, in FIG. 5, as to representative apparatus members, the same references as the references used in FIG. 3 are used. Difference between FIG. 3 and FIG. 5 is the point that, in FIG. 5, a panel material 71 is placed on the upper surface of the apparatus base 32, and thereon, a preform 11a in an embodiment of the present invention is placed.

Characteristic of the preform 11a in an embodiment of the present invention used in the co-bonding method is that a release sheet is not present on a surface to which the panel material 71 is brought into contact. This preform in an embodiment of the present invention on part of which surface a release sheet is not present may be prepared by bonding and integrating release sheets, except the surface not to be present, to the other surface. However, as shown in FIG. 1, it may be prepared by using a preform of which substantially entire surface release sheets are bonded and integrated and peeling off the release sheet of the portion on which surface the release sheet is not necessary. Since the release sheet is also useful for protecting a surface of a reinforcing fiber base, the latter preparation method is more preferable. That is, just before carrying out the co-bonding method, it is better to be provided to a molding after removing a release sheet of the position where it is not necessary.

In a reinforcing fiber base to which a matrix resin is not impregnated, at a time of handling thereof, fuzz of reinforcing fibers may be generated. In view of preventing this generation of fuzz, it is preferable that a release sheet is bonded and integrated to at least one entire surface of the upper and lower surfaces of the reinforcing fiber base. In the same view point, it is preferable that the release sheet is bonded and integrated to at least one entire surface of the both side surfaces along the lengthwise direction of the reinforcing fiber base.

In FIG. 5, in the portion 72 at which the upper surface of the panel material 71 and the lower surface of the preform 11a are contacted with, the release sheet is not present. By that, a matrix resin impregnated to the preform 11a passes through the preform 11a and arrived at the upper surface of the panel material 71 and, along with curing of the matrix resin, bonds the panel material 71 and the preform 11a.

Whereas, a release sheet 71p is present on the upper surface of the panel material 71 in position where it contacts with a resin diffusion medias 39b and 39c, but this release sheet 71p may be manually placed on a surface the panel material 71 after the panel material 71 is placed on the apparatus base 32 of the molding apparatus 61. However, similar to the preform in an embodiment of the present invention, to where it is necessary of the panel material 71, a release sheet may be bonded and integrated beforehand by an adhesive resin. In the latter case, the panel material 71 to which entire upper surface the release sheet is bonded and integrated is prepared and, the release sheet of where it is not necessary may be removed just before carrying out the co-bonding method. And, as another method, by making respective release sheets 12p and 13p into those having sizes respectively reaching only the left side matrix resin injection port 34b and the right side matrix resin injection port 34a, it is possible to make the release sheet 71p is not necessary.

The reinforcing fiber base used in the preform in an embodiment of the present invention comprises many reinforcing fibers. As the reinforcing fiber to be used, there are glass fiber, organic fibers such as aramid fiber, poly-p-phenylene benzobisoxazole (PBO) fiber, polyvinyl alcohol (PVA) fiber or polyethylene (PE) fiber, or carbon fibers such as polyacrylonitrile (PAN)-based and pitch-based. Since carbon fiber is excellent in specific strength and specific modulus, and absorbs almost no water, it is preferably used in case where a fiber-reinforced resin beam for aircraft or car is made.

It is preferable that form of the reinforcing fiber base is, a cloth made of many reinforcing fibers, that is, a reinforcing fiber cloth. As the form of the reinforcing fiber cloth, there is a woven fabric, a knitted fabric, a braided fabric or a sheet in which reinforcing fiber is unidirectionally paralleled (unidirectional sheet). As the woven fabric, there is a unidirectional woven fabric, a bidirectional woven fabric or a multiaxial woven fabric.

In many cases, the reinforcing fiber base is made of a laminate in which plural reinforcing fiber cloths are laminated. In the laminate, plural reinforcing fiber cloths are bonded and integrated with each other by an adhesive resin. Configuration of the bonding between the reinforcing fiber cloths by the adhesive resin may also be partial such as dot-wise or line-wise. In case where the plural reinforcing fiber cloths, of which arranging direction of the reinforcing fibers is unidirectional, are laminated, and in addition, it is necessary to make quality of the laminate structure as uniform as possible, each reinforcing fiber cloth is laminated such that the arranging direction of the reinforcing fibers of each layer is respectively different.

It is preferable that the release sheet used in the preform in an embodiment of the present invention is a cloth made of many fibers, since it is necessary to have ability to be passed by matrix resin. Since it is necessary that the release sheet is peeled off, after the fiber-reinforced resin beam is produced, from a surface of the produced fiber-reinforced resin beam, it is preferable that the cloth constituting the release sheet is a woven cloth. It is preferable that the fiber used for the release sheet is polyester fiber or polyamide fiber. Since various forms of the release sheet are commercially sold, it is possible to select appropriately according to adhesive property to the reinforcing fiber base or molding condition.

As mentioned above, it is necessary that the release sheet is, after the fiber-reinforced resin beam is produced, peeled off from a surface of the fiber-reinforced resin beam produced. There are some cases in which, to the surface of fiber-reinforced resin beam from which the release sheet is removed, another member is bonded and integrated. In this case, when the release sheet is constituted with a polyester fiber woven cloth, the surface from which the release sheet is peeled off is, compared to a surface from which a release sheet is peeled off in a case where the release sheet is constituted with a woven cloth made of other fiber material, better in adhesive property to other members.

Accordingly, it is preferable that the release sheet is made of a polyester fiber woven cloth. And, accordingly, in case where it is not necessary to bond another member or, in case where another member is bonded but there is no problem in adhesive property, it is possible to use other fiber materials, for example, a release sheet made of a woven cloth of polyamide fiber.

The adhesive resin used for bonding the reinforcing fiber base and the release sheet may be either of a thermosetting resin and a thermoplastic resin. In case where the release sheet is bonded to the reinforcing fiber base at room temperature, it is better to use a resin to which adhesive property at room temperature is imparted, by dissolving the resin having no adhesive property at room temperature by a solvent. In this way, the resin is kept in a dry condition after evaporating the solvent. On the other hand, in case where a preform is produced by a continuous preform production process mentioned later, a thermoplastic resin is preferably used.

As the thermoplastic resin, resins such as polycarbonate, polyacetal, polyphenylene oxide, polyvinyl acetate, polyphenylene sulfide, polyarylate, polyester, polyamide, polyamide imide, polyimide, polyether imide, polysulfone, polyether sulfone, polyether ether ketone, polyaramid, polybenzo-imidazole, polyethylene, polypropylene and cellulose acetate can be used.

Whereas, at selecting the resin, it is preferable to select not only in view point of adhesive property of the release sheet with the reinforcing fiber base, but also in view point including to improve impact resistance characteristics, for example, compressive strength after impact at room temperature (CAI—Compression After Impact) of the fiber-reinforced resin beam to be molded.

As the adhesive resin used in case of forming the laminate in which the plural reinforcing fiber cloths are bonded with each other, the same resin as the above-mentioned adhesive resin used for bonding the reinforcing fiber base and the release sheet can be used.

It is preferable that a deposit amount of the adhesive resin deposited on a surface of the reinforcing fiber base for bonding and integrating the release sheet to the surface of the reinforcing fiber base and a deposit amount of the adhesive resin deposited on a surface of one reinforcing fiber cloth of neighboring reinforcing fiber cloths for bonding and integrating the plural reinforcing fiber cloths with each other is $2 \text{ g/m}^2$ to $40 \text{ g/m}^2$.

A lower limit value of the deposit amount is a value preferable for that the respective members to be bonded are, at processing steps which become necessary after that, not peeled off and kept in a desired shape of the preform. An upper limit of the deposit amount is a value preferable for preventing that, due to too much deposit amount, impregnation of the matrix resin into the preform is impaired, or by increasing thickness of interlayer spaces occupied by the adhesive resin, a weight increase of the fiber-reinforced resin beam to be molded is brought about.

It is preferable that a deposit configuration of the adhesive resin to the reinforcing fiber base is, a dot-wise or a continuous or discontinuous line-wise. By depositing the adhesive resin to the reinforcing fiber base in such a configuration, impregnation property of the matrix resin into the preform is improved.

There are three ways as means for preparing the preform in embodiments of the present invention by bonding and integrating the release sheet to a surface of fiber reinforced base material by the adhesive resin.

The first method comprises that, first, the release sheet is laminated to a surface of the reinforcing fiber base (reinforcing fiber base sheet), next, the laminated release sheet and the reinforcing fiber base sheet are heated and/or pressed to bond and integrate the release sheet and the reinforcing fiber base sheet by the adhesive resin, and after that, the reinforcing fiber base sheet to which the release sheet is bonded and integrated is shaped by heating and/or pressing by using a shaping mold such that at least one bent portion is formed in cross-sectional shape.

The second method is a method in which the bonding and integration of the release sheet and the reinforcing fiber base sheet and the shaping of the reinforcing fiber base sheet, in the first method, are simultaneously carried out in one shaping step (one shaping apparatus). That is, the release sheet placed on a surface of reinforcing fiber base sheet and the reinforcing fiber base sheet are as a whole, heated and/or pressed, to carry out bonding and integration of the release sheet to the reinforcing fiber base sheet and a shaping of the reinforcing fiber base sheet together with the release sheet.

The third method comprises that, first, a flat-plate reinforcing fiber base (reinforcing fiber base sheet) is heated and/or pressed to carry out a shaping such that at least one bent portion is formed in cross-sectional shape by using a shaping mold, and after that, the release sheet is laminated to a surface of the shaped reinforcing fiber base sheet, the laminated release sheet and the reinforcing fiber base sheet are heated and/or pressed to bond and integrate the release sheet and the reinforcing fiber base sheet by the adhesive resin.

In the first to third methods, although it is necessary to arrange the adhesive resin between the release sheet and the reinforcing fiber base sheet when the release sheet is laminated to the surface of the reinforcing fiber base sheet, the adhesive resin may be deposited to a surface of the reinforcing fiber base sheet beforehand, or, on the contrary, it may be deposited to a surface of the release sheet. In particular, in case where the reinforcing fiber base to be shaped is a laminate of reinforcing fiber cloths, it is preferable that an adhesive resin of thermoplastic resin is deposited on both surfaces of the reinforcing fiber cloths. In this case, the adhesive resin is heated and pressed to be thermoplastically deformed, and interlayer spaces of the laminated reinforcing fiber cloths with each other are more strongly bonded, to be effective not only for fixing the shape of preform, but also the adhesive resin deposited to the reinforcing fiber cloth is exposed on the surface of reinforcing fiber base sheet to enable to bond and integrate the release sheet to the surface of the laminate of the reinforcing fiber cloth by the adhesive resin.

Since the third method is a method in which, after carrying out the shaping of reinforcing fiber base, the release sheet is put to the shaped reinforcing fiber base, that is, to the reinforcing fiber base having at least one bent portion in cross-sectional shape, there are some cases in which it is difficult to put the release sheet to a desired position depending on its cross-sectional shape. From that point, it can be said that the first method has more degree of freedom than the third method.

On the other hand, it can be said that the second method is more advantageous than the first method in reducing production cost, by the process being simplified, by being able to reduce cost of equipment in its installation, but in the first method, since it is possible to laminate both of the reinforcing fiber base sheet and the release sheet in flat state and to bond and integrate, it is easy to put the release sheet on precise position since positioning of both sheets is easy, but compared to that, in the second method, since the bonding of the release sheet is carried out while carrying out the molding operation of bent portion to the reinforcing fiber base sheet, compared to the first method, it is difficult to put the release sheet at precise position. For the above reasons, among the first to the third methods, the first method is most preferable.

Figure 6:
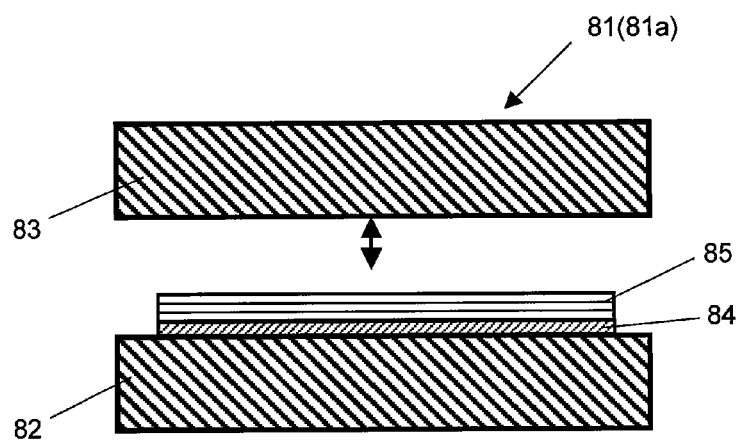
FIG. 6 is a schematic front view of an example of the release sheet bonding apparatus which is used when a reinforcing fiber base and a release sheet are bonded and integrated in a release sheet bonding step in a process for producing the preform in an embodiment of the present invention.

FIG. 6 is a schematic cross-sectional view of an example of the release sheet bonding apparatus for bonding and integrating a release sheet to a surface of a reinforcing fiber base by an adhesive resin, using in the first method. In FIG. 6, a release sheet bonding apparatus 81 comprises a flat-plate bottom mold 82 fixed to the upper surface of a base stand (omitted in the figure) and a flat-plate top mold 83 fixed to a vertical motion mechanism (omitted in the figure) supported by the base stand. In the top mold 83 and the bottom mold 82, heating means are contained therein. This type of an apparatus is, usually, referred to as a flat-plate press 81a.

A release sheet 84 is placed on the upper surface of the bottom mold 82. Next, on the upper surface of the release sheet 84, a reinforcing fiber base 85 to which an adhesive resin is deposited is placed. After completing this preparation work, the top mold 83 goes down toward the bottom mold 82 by the vertical motion mechanism to press the reinforcing fiber base 85 to the release sheet 84. By the pressed state being kept for a predetermined time, the reinforcing fiber base 85 and the release sheet 84 are heated and pressed for a predetermined time necessary for the bonding and integration, and the release sheet 84 is bonded and integrated to the lower surface of the reinforcing fiber base 85, by the adhesive resin deposited to the surface of reinforcing fiber base 85.

After completing the bonding and integration, the top mold 83 moves upward by the vertical motion mechanism, and the reinforcing fiber base to which the release sheet is bonded and integrated is taken out from the release sheet bonding apparatus 81. The reinforcing fiber base taken out is good in its handling since the release sheet is integrated.

In case where the length (a mold length) in lengthwise direction (vertical direction to the paper) of the top mold 83 and the bottom mold 82 in the release sheet bonding apparatus 81 of FIG. 6 is shorter than the length in lengthwise direction of the base material to be bonded, after once subjecting to a bonding treatment of the mold length, the mold is opened, the base material is moved such that successive portion to be bonded is positioned in the position of mold, next, the mold is closed, and next bonding treatment is carried out. That is, the movement of base material and the bonding treatment during the stop of movement of the base material are carried out necessary times intermittently and alternatively, to treat a long base material.

Placement of the base material on the bottom mold 82 may be, in case of a fixed length base material which is not long and less than the mold length, carried out by supplying the fixed length base material by a supply tray (omitted in the drawing) or manually. On the other hand, in case of a long base material (continuous base material) of which length exceeds the mold length and an intermittent movement is necessary, to the release sheet bonding apparatus 81, an intermittent supply apparatus (omitted in the drawing) of the base material and an intermittent taking up apparatus (omitted in the drawing) of the treated base material are equipped.

Figure 7:
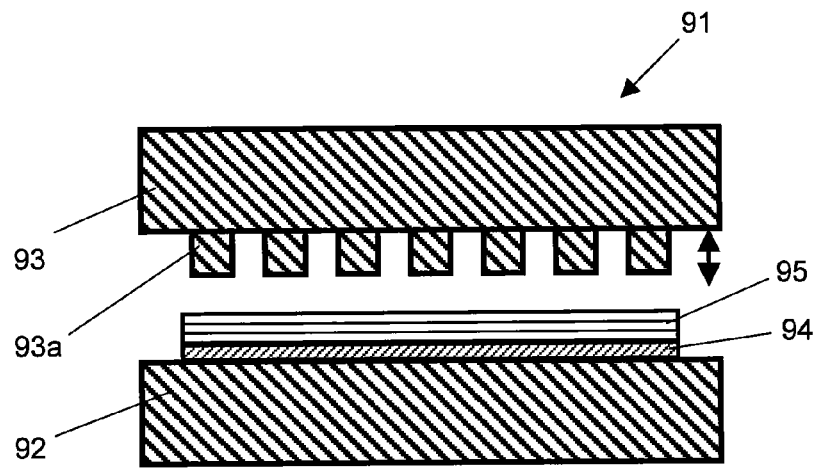
FIG. 7 is a schematic front view of another example of the release sheet bonding apparatus which is used when a reinforcing fiber base and a release sheet are bonded and integrated in a release sheet bonding step in a process for producing the preform in an embodiment of the present invention.

FIG. 7 is a schematic cross-sectional view of another example of the release sheet bonding apparatus for bonding and integrating a release sheet to a surface of a reinforcing fiber base by an adhesive resin. In FIG. 7, a release sheet bonding apparatus 91 has, same as the release sheet bonding apparatus 81 in FIG. 6, a bottom mold 92 and a top mold 93.

Difference between the release sheet bonding apparatus 81 of FIG. 6 and the release sheet bonding apparatus 91 of FIG. 7 is the point that the lower surface of the top mold 93 is not flat and plural protrusions 93a are provided on the lower surface of top mold 93. This protrusion 93a is, usually, referred to as indentor. Other constitutions of the release sheet bonding apparatus 91 except this difference are the same as the constitutions of the release sheet bonding apparatus 81.

By using the release sheet bonding apparatus 91, a release sheet 94 and a reinforcing fiber base 95 are bonded and integrated by an adhesive resin, but the actual bonded portions of both are distributed depending on positions of the protrusions (indentor) 93a, and both are partially bonded. On the other hand, in case where the flat press 81a of FIG. 6 is used, bonded portion of the release sheet 84 and the reinforcing fiber base 85 extends entire surface where both confront with each other, to bond both on the entire surface.

In a reinforcing fiber base to which a release sheet is integrated by this entire surface bonding, when being shaped later, depending on a shape of the shaping, a wrinkle may be generated in the release sheet bonded. In such a case, when the reinforcing fiber base to which the release sheet is integrated by the partial bonding is used, the generation of this wrinkle can be prevented.

Figure 15:
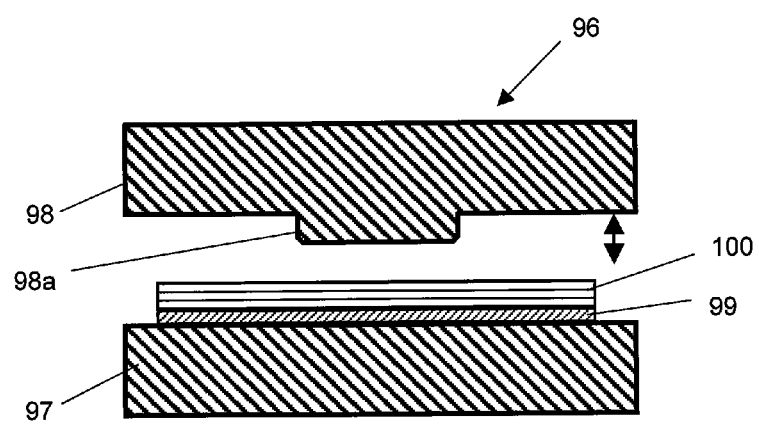
FIG. 15 is a schematic front view of another example of the release sheet bonding apparatus which is used when a reinforcing fiber base and a release sheet are bonded and integrated in a release sheet bonding step in a process for producing a preform in an embodiment of the present invention.

Furthermore, another example of the release sheet bonding apparatus is shown in FIG. 15. In FIG. 15, a release sheet bonding apparatus 96 has, same as the release sheet bonding apparatus 81 of FIG. 6, a bottom mold 97 and a top mold 98. Difference between the release sheet bonding apparatus 81 of FIG. 6 and the release sheet bonding apparatus 96 of FIG. 15 is the point that, at center of the lower surface of the top mold 98, only one of a protruded flat portion 98a formed by protruding from the lower surface is provided. Other constitutions of the release sheet bonding apparatus 96 except this difference are the same as the constitutions of the release sheet bonding apparatus 81.

By using the release sheet bonding apparatus 96, a release sheet 99 and a reinforcing fiber base 100 are, by an adhesive resin, bonded and integrated, but the bonded portion of both becomes only the portion corresponding to the protruded flat portion 98a, and both are partially bonded. By positioning the region of the protruded flat portion 98a, that is, the region to be partially bonded, to a region where not to be a bent portion in cross-sectional shape at forming the bent portion in a later step, since the release sheet is not bound by the reinforcing fiber base sheet at forming the bent portion in later step, an appropriate curve can be formed, same as the partial bonding by the above-mentioned protrusion (indentor) 93a, a wrinkle of the release sheet can be prevented.

Figure 8:
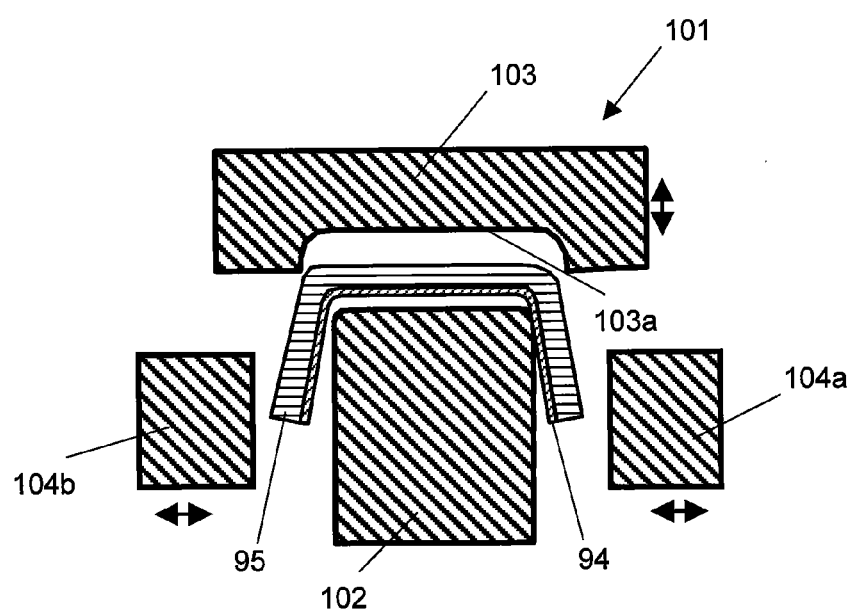
FIG. 8 is a schematic cross sectional view of an example of the preshaping mold which is used when a reinforcing fiber base and a release sheet are preshaped in a preshaping step in a process for producing the preform in an embodiment of the present invention.

In FIG. 8, an example of the shaping apparatus, for shaping a reinforcing fiber base or a reinforcing fiber base to which a release sheet is bonded and integrated such that at least one bent portion is formed in its cross-sectional shape, is shown. Such a shaping apparatus itself has been known in the past.

FIG. 8 is a schematic cross sectional view of a shaping apparatus 101. The shaping apparatus 101 comprises, a bottom mold 102 fixed to a base stand (omitted in the figure), a top mold 103 movably supported in the vertical direction by the base stand, a right side mold 104a movably supported in the horizontal direction by the base stand, and a left side mold 104b movably supported in the horizontal direction by the base stand.

On the lower surface of the top mold 103, a concave groove 103a of its cross-sectional shape is U-shaped (C-shape) is provided in lengthwise direction of the top mold 103 (vertical direction to the figure). The upper surface of the bottom mold 102 is made as, in consideration of thickness of a base material to be shaped, a reverse U-shaped top portion in cross-sectional shape which fits to the concave groove 103a of the top mold 103. The left side surface of the right side mold 104a and the right side surface of the left side mold 104b are flat surfaces, respectively. In the respective of the bottom mold 102, the top mold 103, the right side mold 104a and the left side mold 104b, heating means are contained.

By FIG. 8, it is explained that a reinforcing fiber base 95 to which a flat release sheet 94 is bonded and integrated, formed by the release sheet bonding apparatus 91 of FIG. 7, is shaped into a preform in an embodiment of the present invention of which cross-sectional shape is C-shaped. In FIG. 8, first, the reinforcing fiber base 95 to which the flat release sheet 94 is bonded and integrated is placed on the upper surface of the bottom mold 102. Next, the top mold 103 goes down and between it and the bottom mold 102, heats and presses the center portion of width direction of the reinforcing fiber base 95 to which the release sheet 94 is bonded and integrated.

In addition, the right side mold 104a moves to the direction of the bottom mold 102 and heats and presses, between the right side mold 104a and the bottom mold 102, the right side end portion of the width direction of the reinforcing fiber base 95 to which the release sheet 94 is bonded and integrated.

Furthermore, the left side mold 104b moves to the direction of the bottom mold 102 and heats and presses, between the left side mold 104b and the bottom mold 102, the left side end portion of the width direction of the reinforcing fiber base 95 to which the release sheet 94 is bonded and integrated.

By the heat and pressure of these molds, the reinforcing fiber base 95 to which the release sheet 94 is bonded and integrated which is flat at first becomes a preform in an embodiment of the present invention having the right side bent portion and the left side bent portion in cross-sectional shape.

By being heated the reinforcing fiber base to which the release sheet is bonded and integrated, the adhesive resin, which bonds and integrates the release sheet and the reinforcing fiber base, and the adhesive resin, which bonds and integrates the reinforcing fiber cloths in the reinforcing fiber base with each other, are softened. By this softening, a freedom of movement in each base material is secured and shaping property in the shaping apparatus is improved, and as a result, a generation of wrinkle of the release sheet or of the reinforcing fiber base during the shaping is prevented. For that reason, it is better that the reinforcing fiber base to which the release sheet is bonded and integrated is put after being heated beforehand, when it is put in the shaping apparatus 101.

However, for example, in case where the base material, to which the release sheet is partially bonded to the reinforcing fiber base prepared by using the release sheet bonding apparatus shown in FIG. 7 or FIG. 15, is used, since a freedom of movement of each base material can be obtained by the partial bonding, in this case, as far as it can be confirmed that a wrinkle of each base material is not generated when the pre-heating in the shaping apparatus is omitted, the preheating of the each base material may be omitted.

In the shaping apparatus 101 of FIG. 8, by disusing the right side mold 104a and the left side mold 104b and by enlarging thickness of the concave groove 103a provided on the lower surface of the top mold 103, it may be made into a shaping apparatus in which the base material is shaped by the top mold 103 and the bottom mold 102 but, in this case, during the shaping, it becomes easy that a wrinkle is generated to the each base material. Accordingly, in order to prevent the generation of wrinkle, it is preferable that the shaping apparatus is, as shown in FIG. 8, a divided type to which the right side mold 104a and the left side mold 104b are provided.

In case where the length (a mold length) of shaping apparatus 101 in FIG. 8 in lengthwise direction (vertical direction to the paper) is shorter than the length in lengthwise direction of the base material to be shaped, after once subjecting to a shaping treatment of the mold length, the mold is opened, the base material is moved such that the portion to be successively subjected to next shaping treatment is positioned in the mold position, and next, the mold is closed and the next shaping treatment may be carry out. That is, by carrying out the intermittent treatment necessary times, a long base material can be treated.

The placement on the bottom mold 102 may, in case where the base material is less than the mold length, be carried out manually, but in case of a long base material of which length exceeds the mold length and where an intermittent treatment is necessary, it is better that a base material supply apparatus (omitted in the drawing) and a base material take up apparatus (omitted in the drawing) are provided to the shaping apparatus 101.

The shaping apparatus 101 shown in FIG. 8 is a shaping apparatus used for shaping into C-shaped (U-shape) cross-sectional shape but, by changing cross-sectional shape of the mold used therein, for example, it is possible to produce shaped objects of various cross-sectional shapes shown in FIG. 2. However, in order to produce a shaped object of which cross-sectional shape is complicated by one shaping apparatus, a mechanical difficulty is brought about. In order to avoid this difficulty, or in order to simplify the shaping step, it is better to integrate plural shaped objects having simple cross-sectional shape, to produce a desired shaped object. Each shaped object before the integration of this case is referred to as preshaped object.

Figure 9:
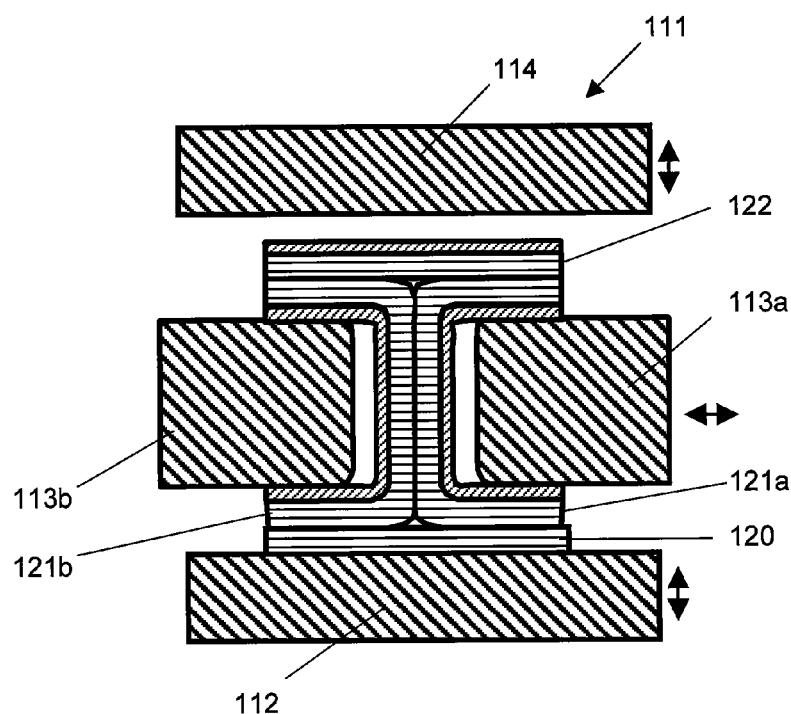
FIG. 9 is a schematic cross sectional view of an example of the preshaped object bonding apparatus which is used at a preshaped object bonding step in a process for producing the preform in an embodiment of the present invention.

FIG. 9 is a schematic cross-sectional view of an example of the preshaped object bonding apparatus 111 for producing one shaped object from plural preshaped objects. The preshaped object bonding apparatus 111 comprises, a bottom mold 112 supported by a base stand (omitted in the figure) movably in the vertical direction, a right side mold 113a supported by the base stand movably in the horizontal direction, a left side mold 113b fixed to the base stand and a top mold 114 supported by the base stand movably in the vertical direction.

The lower surface of the right side mold 113a and the lower surface of the left side mold 113b are, with respect to the upper surface of the bottom mold 112, in consideration of thickness of a preshaped object to be arranged, positioned spaced apart. The upper surface of the right side mold 113a and the upper surface of the left side mold 113b are, with respect to the lower surface of the top mold 114, in consideration of thickness of a preshaped object to be arranged, positioned spaced apart. In the respective of the bottom mold 112, the right side mold 113a, the left side mold 113b and the top mold 114, heating means are contained.

In FIG. 9, on the upper surface of the bottom mold 112, a flat-plate lower side preshaped object 120 is placed. Although this lower side preshaped object 120 is a reinforcing fiber base to which a release sheet is not bonded and integrated, plural reinforcing fiber cloths are bonded and integrated beforehand under heat and/or pressure by an adhesive resin, that is, it is preshaped.

On the upper surface of the lower side preshaped object 120, a C-shaped right side preshaped object 121a and a C-shaped left side preshaped object 121*b* are placed back-to-back, respectively. On the upper surfaces of the C-shape right side preshaped object 121*a* and the C-shape left side preshaped object 121*b*, a flat-plate upper side preshaped object 122 is placed.

The C-shaped right side preshaped object 121*a* and the C-shaped left side preshaped object 121*b* are preshaped by the shaping apparatus 101 shown in FIG. 8, and comprise the reinforcing fiber base 95 to which the release sheet 94 is bonded and integrated. An upper side preshaped object 122 comprises the reinforcing fiber base 95 to which the release sheet 94 is bonded and integrated by being bonded and integrated the release sheet 94 and the reinforcing fiber base 95 by the release sheet bonding apparatus 91 shown in FIG. 7, that is, by being preshaped.

Integration of each preshaped object is carried out by that the right side mold 113*a* goes into a C-shaped concave portion along the lower surface of an upper side flange portion and the upper surface of a lower side flange portion of the right side preshaped object 121*a*, and by its function, the left side mold 113*b* goes into a C-shaped concave portion along the lower surface of an upper side flange portion and the upper surface of a lower side flange portion of the left side preshaped object 121*b*, to hold and press a web portion of the respective preshaped objects, and simultaneously or in a short time, the top mold 114 and the bottom mold 112 goes down and up, respectively, to press the upper side preshaped object 122 and the lower side preshaped object 120.

The bonding and integration of each preshaped object with each other are carried out by an adhesive resin contained in the respective preshaped objects. Whereas, as required, before the bonding and integration, on surfaces to be bonded with each other of each preshaped object, an adhesive resin may be deposited again. By this bonding and integration step of the respective preshaped objects, a preform in an embodiment of the present invention is molded.

In case where the length in lengthwise direction (vertical direction to the figure) of the preshaped object bonding apparatus 111 in FIG. 9 (a mold length) is shorter than the length in lengthwise direction of the base material to be bonded, after once subjecting to a bonding treatment of the mold length, the mold is opened, the base material is moved such that successive portion to be bonded is positioned in the mold position, and next, the mold is closed, and the successive bonding treatment may be carried out. That is, it is possible to treat a long base material by carrying out the intermittent treatment necessary times.

Setting of each base material into the preshaped object bonding apparatus 111 may be, in case where the base material is less than the mold length, carried out manually, but in case of a long base material of which length exceeds the mold length and an intermittent treatment is necessary, it is better that the preshaped object bonding apparatus 111 is equipped with a base material supply apparatus (omitted in the drawing) and a base material take up apparatus (omitted in the drawing).

As means for heating the respective molds in the release sheet bonding apparatus, the shaping apparatus and the preshaped object bonding apparatus, for example, electrical heating means such as silicone heater, or heat medium heating means such as hot water or hot oil are used. And, as pressing means in the respective apparatuses, for example, pressing means by pressurized air generated by a compressor is employed.

There are some cases where a fiber-reinforced resin beam of which height in cross-sectional shape is changed in lengthwise direction is requested. In particular, in structural member for aircraft, of which fiber-reinforced resin beam used for a wing structural member, there are cases where a beam of which cross-sectional shape is changed.

It is very difficult to arrange a release sheet to a reinforcing fiber base along the surface shape thereof which has a branch portion and of which height is changed, in a vacuum bag molding process. This difficulty is solved by using a preform in an embodiment of the present invention in the vacuum bag molding process, that is, the preform to which a release sheet is bonded and integrated beforehand to the reinforcing fiber base by an adhesive resin.

There are some cases where a fiber-reinforced resin beam of which thickness of a web portion and/or a flange portion is changed along lengthwise direction thereof is requested. This change of thickness is made by, usually, increasing or decreasing number of plies of a reinforcing fiber cloth in the web portion and/or the flange portion. Accordingly, this change of thickness is referred to as ply drop.

Figure 10:
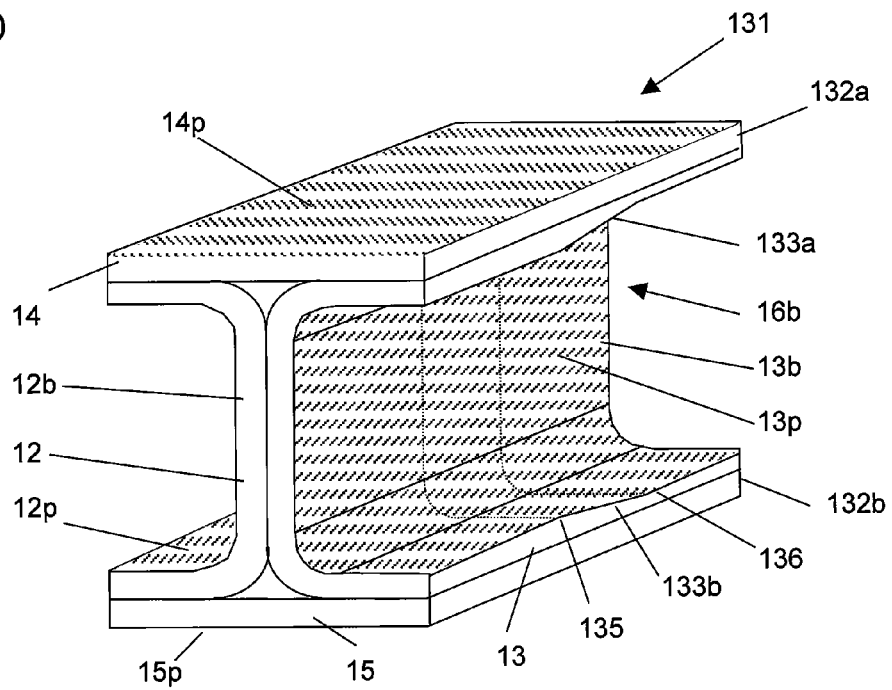
FIG. 10 is a perspective view of an example of the preform in an embodiment of the present invention having a ply drop portion.

FIG. 10 is a perspective view of an example of an I-shaped preform in an embodiment of the present invention having a ply drop in a flange portion. In FIG. 10, a preform 131 in an embodiment of the present invention has a ply drop 133*a* in the upper side flange portion 132*a* and a ply drop 133*b* in the lower side flange portion 132*b*. The preform 131 is, except having these ply drops, the same as the I-shaped preform 11 in an embodiment of the present invention shown in FIG. 1. Accordingly, in FIG. 10, for the same members as the structural members of the preform 11 shown in FIG. 1, the same references are given.

Figure 11:
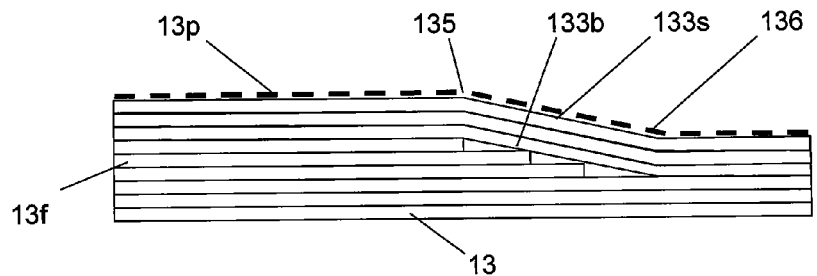
FIG. 11 is a detailed longitudinal sectional view of the ply drop portion of the preform in an embodiment of the present invention shown in FIG. 10.

FIG. 11 is a side view of the lower side flange portion of the preform 131 shown in FIG. 10. The number of plies of plural reinforcing fiber cloths 13*f* which form the reinforcing fiber base 13 in the lower side flange portion decreases toward the ending point 136 from the starting point 135 of the ply drop 133*b*. In FIG. 11, an example in which the number of plies of the reinforcing fiber cloth 13*f* decreases by three plies is shown. By the decrease of number of plies of the reinforcing fiber cloth 13*f*, on the surface of the reinforcing fiber base 13 in the flange portion, a slope 133*s* is formed. Over the surface of the slope 133*s* of the reinforcing fiber base 13 and flat surfaces of both sides thereof, a continuous release sheet 13*p* is bonded and integrated by an adhesive resin.

It is very difficult to arrange a release sheet to a reinforcing fiber base along the surface shape thereof which has a branch portion and also has a ply drop, in a vacuum bag molding process. This difficulty is solved by using a preform in an embodiment of the present invention in the vacuum bag molding process, that is, the preform to which a release sheet is bonded and integrated beforehand to the reinforcing fiber base by an adhesive resin.

It is preferable that a volume fraction Vpf of the reinforcing fiber in the preform in an embodiment of the present invention is 45 to 65%.

The volume fraction Vpf of reinforcing fiber is calculated from thickness t (mm) of the reinforcing fiber base on which a pressure corresponding to atmospheric pressure, 0.1 MPa, is exerted, based on the following equation.

$$Vpf = F \times p / \rho / t / 10$$

Here, F: weight (g/m$^2$) of reinforcing fiber in the base material, p: number of plies of reinforcing fiber cloth in the base material, ρ: density (g/cm$^3$) of reinforcing fiber in the base material.

Measurement of thickness T1 (mm) of the preform is carried out in accordance with the thickness measuring method described in the test method of carbon fiber woven fabric described in JIS-R-7602 (1995), by changing the pressure to 0.1 MPa.

At vacuum RTM molding method at which vacuum is used, usually, a matrix resin is injected and impregnated into the preform in a condition in which atmospheric pressure is loaded on preform. Accordingly, the volume fraction Vpf of reinforcing fiber in the preform when a pressure corresponding to atmospheric pressure, 0.1 MPa, is exerted is measured.

In the preform in an embodiment of the present invention, since the release sheet is bonded and integrated by an adhesive resin on the surface of reinforcing fiber cloth which constitutes the surface layer, thickness t (mm) of the reinforcing fiber base is determined by subtracting thickness T2 of the release sheet from thickness T1 (mm) of the preform obtained by the above-mentioned thickness measurement of the preform.

In case where the preform has a complicated shape and a measurement is impossible by the measuring method based on JIS-R-7602 (1995), by cutting out a sample for measurement from the preform and thickness T1 (mm) of the preform is determined under atmospheric pressure. In this case, it is necessary to carefully cut out the sample for measurement such that thickness of the preform is not changed.

In case where the cutting out of sample for measurement is also impossible, the preform is placed on the mold, covered with a bagging film and in condition where atmospheric pressure is exerted on the preform by vacuum bagging, total thickness of all the preform, mold and bagging film is measured, and by subtracting thicknesses of the mold and bagging film from the total thickness, thickness of the preform is measured.

When a volume fraction Vpf of reinforcing fiber is less than 45%, it is not preferable since a volume fraction Vf of reinforcing fiber of a fiber-reinforced resin beam molded from the preform is low and a weight increase of the fiber-reinforced resin beam molded is brought about.

There is a method in which, after a matrix resin is injected and impregnated into a preform of which volume fraction Vpf of reinforcing fiber is low, for example, Vpf is less than 45%, the injection of matrix resin is stopped and by suctioning and removing the matrix resin excessively impregnated into inside of the preform from a suction port, to adjust to a desired volume fraction Vf of reinforcing fiber. However, even if this method is applied, it may be impossible to suction and remove the excess matrix resin uniformly throughout the whole member in a large-sized structural member. And, since the matrix resin which is suctioned and removed is discarded, there is a problem that the production cost is raised.

In case where a volume fraction Vpf of reinforcing fiber exceeds 65%, since the reinforcing fiber density of preform is too high, it is not preferable since impregnation of matrix resin into the preform becomes impossible, to generate a portion not impregnated with the resin. In view of this point, it is preferable that a volume fraction Vpf of reinforcing fiber is 50 to 60%.

The preshaped object bonding apparatus has functions not only to integrate plural preshaped objects, but also to control reinforcing fiber volume fraction Vpf in the preform to be produced. Constitution of the reinforcing fiber base is determined by selection of reinforcing fiber of the reinforcing fiber base, structure of the base material formed by reinforcing fiber, combination of plural reinforcing fiber cloths to be molded into the reinforcing fiber base or the like, such that the value of reinforcing fiber volume fraction Vpf becomes a desired value. On the other hand, if necessary, it is possible to finally control the value of reinforcing fiber volume fraction Vpf, by adjusting thickness of each base material by heat and pressure by each mold at the preshaped object bonding apparatus.

Accordingly, it is preferable that the preshaped object bonding apparatus not only can bond and integrate plural preshaped objects but also has a heating and pressing mechanism such that it can control reinforcing fiber volume fraction Vpf of the preform.

The adjustment of the reinforcing fiber volume fraction Vpf can also be carried out in the shaping apparatus by taking advantage of a similar heating and pressing function, and the each preshaped object of which reinforcing fiber volume fraction Vpf was adjusted in the shaping apparatus may be bonded and integrated in the preshaped object bonding apparatus. In case where movement of the respective molds in the shaping apparatus is simpler than movement of the respective molds of the preshaped object bonding apparatus, it is preferable that the adjustment of the reinforcing fiber volume fraction Vpf is carried out in the shaping apparatus.

On the other hand, when a reinforcing fiber volume fraction Vpf of the preshaped object obtained in the shaping apparatus is lower than reinforcing fiber volume fraction Vpf of a desired preform, since, in addition to bond and integrate the respective preshaped objects into a preform shape having a complicated shape in the preshaped object bonding apparatus, furthermore a control of heat and pressure in the complicated preform shape becomes necessary, in such a case, it is preferable that the adjustment of the reinforcing fiber volume fraction Vpf is carried out in the shaping apparatus.

Figure 12:
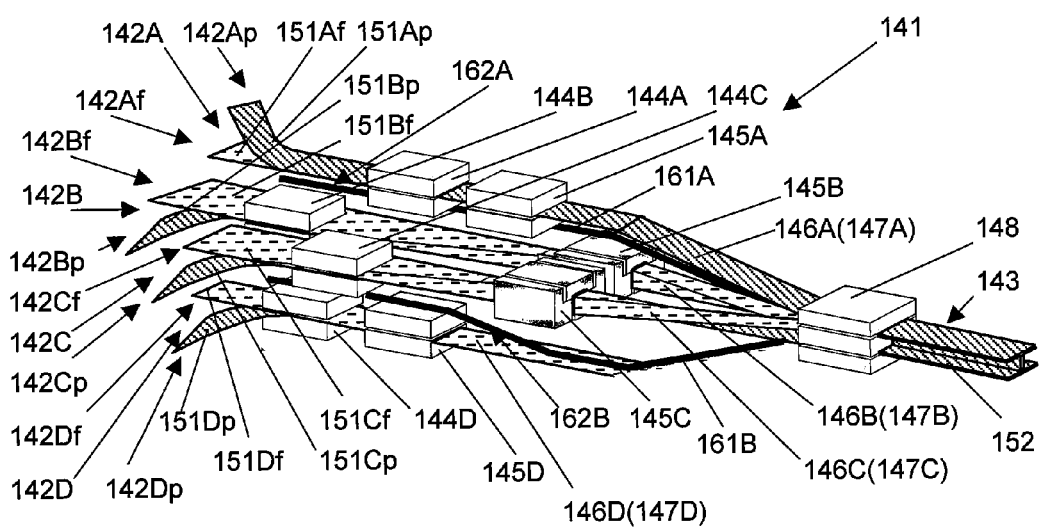
FIG. 12 is a schematic perspective view of an example of the apparatus for producing a preform in an embodiment of the present invention having I-shaped cross-sectional shape.

FIG. 12 is a schematic perspective view of an apparatus for producing an I-shaped preform in an embodiment of the present invention shown in FIG. 1, from four continuous reinforcing fiber base sheets (tape, band or strip) and four continuous release sheets (tape, band or strip). In FIG. 12, an apparatus 141 for producing a preform has, at its inlet side, eight continuous sheet feeding lines and, at its outlet side, a take-up line 143 of a preform in an embodiment of the present invention.

In FIG. 12, the eight continuous sheet feeding lines are constituted with, from the upper side in turn, an upper side flange portion release sheet feeding line 142Ap, an upper side flange portion reinforcing fiber base sheet feeding line 142Af, a right C-shape web portion reinforcing fiber base sheet feeding line 142Bf, a right C-shape web portion release sheet feeding line 142Bp, a left C-shape web portion reinforcing fiber base sheet feeding line 142Cf, a left C-shape web portion release sheet feeding line 142Cp, a lower side flange portion reinforcing fiber base sheet feeding line 142Df and a lower side flange portion release sheet feeding line 142Dp.

In the upstream side of the upper side flange portion release sheet feeding line 142Ap, a raw material supply roll (omitted in the figure) on which a continuous upper side flange portion release sheet 151Ap is wound in a roll state is provided, and from there, the continuous upper side flange portion release sheet 151Ap which is the raw material is supplied to the upper side flange portion release sheet feeding line 142Ap with an intermittent supply in which, after a predetermined treating length is supplied, the supply is stopped.

In the other feeding lines 142Af, 142Bf, 142Bp, 142Cf, 142Cp, 142Df and 142Dp, also, in the upstream side of the respective lines, raw material supply rolls (omitted in the figure) similar to the raw material supply roll in the upper side flange portion release sheet feeding line 142Ap are respectively provided, and from there, respective raw materials 151Af, 151Bf, 151Bp, 151Cf, 151Cp, 151Df and 151Dp are supplied to the respective feeding lines with an intermittent supply in which, after a predetermined treating length is supplied, the supply is stopped.

The upper side flange portion release sheet feeding line 142Ap and the upper side flange portion reinforcing fiber base sheet feeding line 142Af constitute one set of molding line 142A. The right C-shaped web portion reinforcing fiber base sheet feeding line 142Bf and the right C-shaped web portion release sheet feeding line 142Bp constitute one set of molding line 142B. The left C-shape web portion reinforcing fiber base sheet feeding line 142Cf and the left C-shape web portion release sheet feeding line 142Cp constitute one set of molding line 142C. The lower side flange portion reinforcing fiber base sheet feeding line 142Df and the lower side flange portion release sheet feeding line 142Dp constitute one set of molding line 142D.

In the molding line 142A, from the upstream side to the down stream side, a release sheet bonding apparatus 144A and a shaping apparatus 145A are provided. As the release sheet bonding apparatus 144A, for example, the release sheet bonding apparatus 81 shown in FIG. 6 or the release sheet bonding apparatus 91 shown in FIG. 7 is preferably used. As the shaping apparatus 145A, for example, an apparatus similar to the release sheet bonding apparatus 81 shown in FIG. 6 is preferably used.

To the release sheet bonding apparatus 144A, a reinforcing fiber base sheet 151Af and a release sheet 151Ap of a fixed length appropriate for a raw material treating length of this apparatus are supplied and stopped. After that, a mold of the release sheet bonding apparatus 144A is closed, and under heat and pressure, the release sheet 151Ap is bonded and integrated to the upper surface of the reinforcing fiber base sheet 151Af.

Next, the reinforcing fiber base 151Af to which the release sheet 151Ap is integrated is supplied to the shaping apparatus 145A and then stopped there, to be shaped into a flat-plate-shape by the shaping apparatus 145A under heat and/or pressure. By the intermittent motion of the release sheet bonding apparatus 144A and the shaping apparatus 145A, a flat-plate preform 146A to which the continuous release sheet is integrated is molded.

Since there is no big difference mechanically and functionally between the release sheet bonding apparatus 144A and the shaping apparatus 145A, it is possible to use any one of them, and save the other.

In the molding line 142D, exactly the same as the case of the molding line 142A, from the upstream side to the down stream side, a release sheet bonding apparatus 144D and a shaping apparatus 145D are provided. Since the release sheet bonding apparatus 144D and the shaping apparatus 145D function as exactly the same as the release sheet bonding apparatus 144A and the shaping apparatus 145A, a detailed explanation is omitted. By the shaping apparatus 145D, a flat-plate preform 146D to which the continuous release sheet is integrated is molded.

In the molding line 142B, from the upstream side to the down stream side, a release sheet bonding apparatus 144B and a shaping apparatus 145B are provided. As the release sheet bonding apparatus 144B, for example, the release sheet bonding apparatus 81 shown in FIG. 6, the release sheet bonding apparatus 91 shown in FIG. 7, or the release sheet bonding apparatus 96 shown in FIG. 15 is preferably used. As the shaping apparatus 145B, for example, the shaping apparatus 101 shown in FIG. 8 is preferably used.

To the release sheet bonding apparatus 144B, a reinforcing fiber base sheet 151Bf and a release sheet 151Bp of a fixed length appropriate for a raw material treating length of this apparatus are supplied and stopped. After that, a mold of the release sheet bonding apparatus 144B is closed, and under heat and pressure, the release sheet 151Bp is bonded and integrated to the lower surface of the reinforcing fiber base sheet 151Bf.

Next, the reinforcing fiber base 151Bf to which the release sheet 151Bp is integrated is supplied to the shaping apparatus 145B and then stopped there, to be shaped into a C-shape by the shaping apparatus 145B under heat and/or pressure. By the intermittent motion of the release sheet bonding apparatus 144B and the shaping apparatus 145B, a C-shaped preform 146B to which the continuous release sheet is integrated is molded.

In the molding line 142C, exactly the same as the case of the molding line 142B, from the upstream side to the down stream side, a release sheet bonding apparatus 144C and a shaping apparatus 145C are provided. Since the release sheet bonding apparatus 144C and the shaping apparatus 145C function as exactly the same as the release sheet bonding apparatus 144B and the shaping apparatus 145B, a detailed explanation is omitted. By the shaping apparatus 145C, a C-shaped preform 146C to which the continuous release sheet is integrated is molded.

The flat-plate preform 146A which is molded in the molding line 142A is a preshaped object 147A. The flat-plate preform 146D which is molded in the molding line 142D is a preshaped object 147D. The C-shaped preform 146B which is molded in the molding line 142B is a preshaped object 147B. The C-shaped preform 146C which is molded in the molding line 142C is a preshaped object 147C.

These preshaped objects 147A, 147B, 147C and 147D are supplied to a preshaped object bonding apparatus 148 provided in the down stream side of the respective shaping apparatuses. As the preshaped object bonding apparatus 148, for example, the preshaped object bonding apparatus 111 shown in FIG. 9 is preferably used. In the preshaped object bonding apparatus 148, the respective preshaped objects are, under heat and/or pressure, at respective surfaces to be bonded of the reinforcing fiber base sheets, bonded and integrated by an adhesive resin, to be molded into a preform 152 in an embodiment of the present invention.

The preform 152 molded is intermittently taken up along a preform take-up line 143. The intermittent motion of the respective molding lines and preform take-up line are carried out synchronously with the intermittent taking up of the preform 152. In FIG. 12, an illustration of an apparatus for the intermittent movement of the respective materials in the apparatus 141 for producing the preform is omitted, but since such an apparatus for the intermittent movement of each material has been well known in the past, it can be used.

In the apparatus 141 for producing the preform of FIG. 12, a filler feeding line 162A for supplying a filler 161A to the preshaped object bonding apparatus 148 to fill a gap portion formed between the upper surface of the branch portion 16B1 shown in FIG. 1 and the lower surface of the reinforcing fiber base 14, and, a filler feeding line 162B for supplying a filler 161B to the preshaped object bonding apparatus 148 to fill a gap portion formed between the lower surface of the branch portion 16B2 and the upper surface of the reinforcing fiber base 15, are provided. The filler 161A and the filler 161B are, along the respective feeding lines, intermittently supplied to the preshaped object bonding apparatus 148.

In the apparatus 141 for producing the preform of FIG. 12, in the down stream side of the preshaped object bonding apparatus 148, a trimming apparatus which trims an end portion of the preform 152 to finally make into a preform having a predetermined cross-sectional shape, may be provided. This trimming apparatus may be prepared independently apart from the continuous process. The trimming apparatus independently prepared is used when an end portion of the preform produced by the preshaped object bonding apparatus (for example, the preshaped object bonding apparatus of FIG. 9) is, as required, subjected to a trimming.

Figure 13:
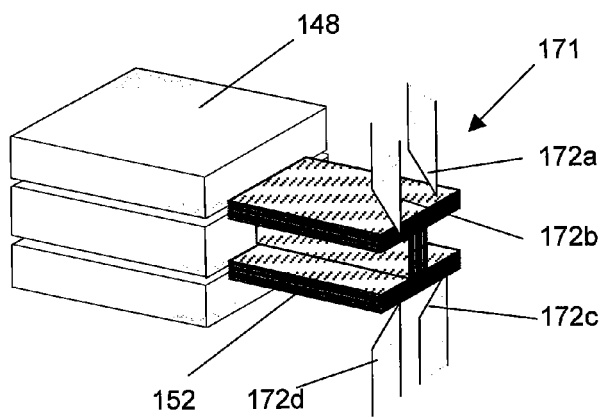
FIG. 13 is a schematic perspective view of an example of the trimming apparatus which is used for adjusting shape of a preform in an embodiment of the present invention.

FIG. 13 is a schematic perspective view of an example of the trimming apparatus. In FIG. 13, an end portion of the preform 152 moved from the preshaped object bonding apparatus 148 shown in FIG. 12 is trimmed by a trimming apparatus 171. The trimming apparatus 171 has two upper trimming blades 172a and 172b in the upper side and two lower trimming blades 172c and 172d in the lower side. The respective trimming blades are supported by a base stand (omitted in the figure) and are made to be movable along the lengthwise direction of the preform 152. The respective trimming blades move in a trimming section back and forth according to the intermittent movement of the preform 152. Such a trimming apparatus itself has been commercially sold.

By the upper trimming blades 172a and 172b, shapes of both end portions in lengthwise direction of the upper flange portion of the preform 152 is adjusted. By the lower trimming blades 172c and 172d, shapes of both end portions in lengthwise direction of the lower flange portion of the preform 152 is adjusted.

Figure 14:
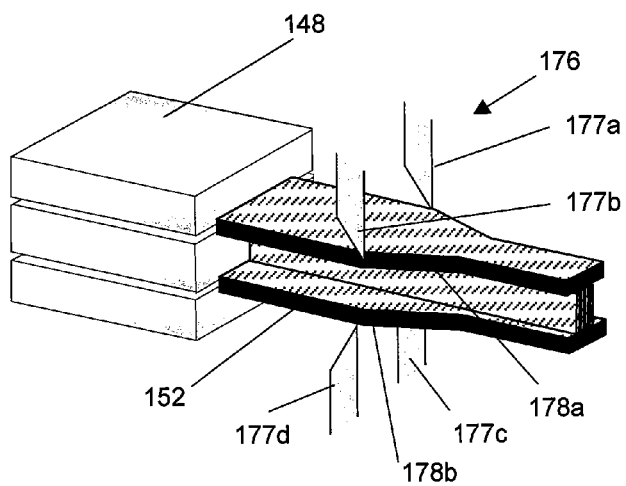
FIG. 14 is a schematic perspective view of another example of the trimming apparatus which is used for adjusting shape of a preform in an embodiment of the present invention.

FIG. 14 is a schematic perspective view of another example of the trimming apparatus. In FIG. 14, an end portion of the preform 152 moved from the preshaped object bonding apparatus 148 shown in FIG. 12 is trimmed by a trimming apparatus 176. The trimming apparatus 176 has two upper trimming blades 177a and 177b in the upper side and has two lower trimming blades 177c and 177d in the lower side. The respective trimming blades are supported by a base stand (omitted in the figure) and are made movable along lengthwise direction and width direction of the preform 152. The upper trimming blades 177a and 177b move also, after moving a fixed length in lengthwise direction, while moving in lengthwise direction, in width direction such that the distance therebetween is widened.

By this way, a tapered portion 178a is formed in the upper flange portion of the preform 152. As to the lower trimming blades 177c and 177d, similarly, a tapered portion 178b is formed in the lower flange portion of the preform 152.

The respective trimming blades move, according to the intermittent movement of the preform 152, back and forth in lengthwise direction and/or width direction of the trimming section. Such a trimming apparatus itself has been commercially sold.

In the preform 152 in an embodiment of the present invention, at trimming a side end portion of the lengthwise direction into a predetermined shape, since the release sheet is bonded and integrated to the surface, a disturbance of the reinforcing fiber base (reinforcing fiber cloth) can be prevented. Accordingly, there is no disturbance of the reinforcing fibers in the preform after the trimming or there is little, and a good shaped and high quality preform can be obtained.

On the other hand, since a preform of conventional art is in a state which is still not impregnated with a matrix resin and reinforcing fibers are exposed on a surface, at a trimming, arrangement of the reinforcing fibers is easy to be disturbed. Accordingly, it was necessary that the trimming is carried out precisely and very carefully.

Figure 16:
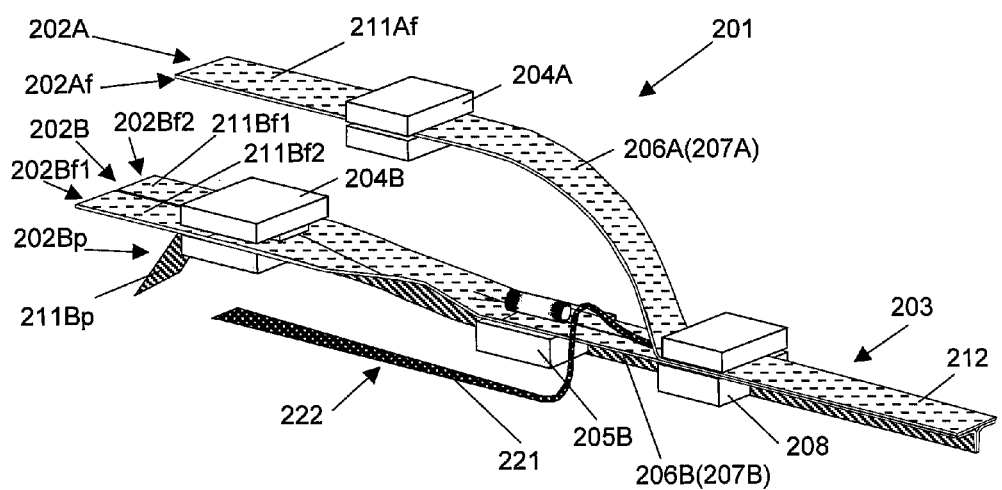
FIG. 16 is a schematic perspective view of an example of the apparatus for producing a preform in an embodiment of the present invention having T-shape cross-sectional shape.

FIG. 16 is a schematic perspective view of an apparatus for producing a T-shaped preform in an embodiment of the present invention shown in FIG. 2 (e) from three continuous reinforcing fiber base sheets (tape, band or strip) and one continuous release sheet (tape, band or strip). Whereas, in this embodiment, the release sheet is put on a surface of the web portion side of left and right flange portions of the T-shaped preform and on the periphery of web portion. In FIG. 16, an apparatus 201 for producing a preform has, in its inlet side, four continuous sheet feeding lines, and in its outlet side, a preform take-up line 203 of a preform in an embodiment of the present invention.

In FIG. 16, the four continuous sheet feeding lines comprise, from the upper side in turn, an upper side flange portion reinforcing fiber base sheet feeding line 202Af, a right L-shaped reinforcing fiber base sheet feeding line 202Bf1, a left L-shaped reinforcing fiber base sheet feeding line 202Bf2 and a left and right L-shaped release sheets feeding line 202Bp.

In the feeding lines 202Af, 202Bf1, 202Bf2 and 202Bp, similar to the case of the above-mentioned I-shaped preform producing apparatus shown in FIG. 12, in the respective upstream sides, raw material supply rolls (omitted in the figure) are respectively prepared, and from there, the respective raw materials 211Af, 211Bf1, 211Bf2 and 211Bp are supplied to the respective feeding lines by an intermittent supply in which, after a predetermined treating length is supplied, the supply is stopped.

The upper side flange portion reinforcing fiber base sheet feeding line 202Af constitutes a molding line 202A. The right L-shaped reinforcing fiber base sheet feeding line 202Bf1 and the left L-shaped reinforcing fiber base sheet feeding line 202Bf2, and left and right L-shaped release sheet feeding line 202Bp constitute a set of molding line 202B.

In the molding line 202A, from the upstream side to the down stream side, a shaping apparatus 204A is provided. As the shaping apparatus 204A, for example, an apparatus similar to the release sheet bonding apparatus 81 shown in FIG. 6 is used.

To the shaping apparatus 204A, the reinforcing fiber base sheet 211Af of a fixed length appropriate for a raw material treating length of this apparatus is supplied and stopped. After that, a mold of the shaping apparatus 204A is closed, and under heat and/or pressure, the base sheet is molded into a flat-plate shape. By intermittent motion of this shaping apparatus 204A, a continuous flat-plate preform 206A is molded.

In the molding line 202B, from the upstream side to the down stream side, a release sheet bonding apparatus 204B and a shaping apparatus 205B are provided. As the release sheet bonding apparatus 204B, for example, the release sheet bonding apparatus 81 shown in FIG. 6, the release sheet bonding apparatus 91 shown in FIG. 7 or the release sheet bonding apparatus 96 shown in FIG. 15 is preferably used.

To the release sheet bonding apparatus 204B, the reinforcing fiber base sheet 211Bf1 and the reinforcing fiber base sheet 211Bf2, of a fixed length appropriate for a material treating length of this apparatus, and the release sheet 211Bp, of which sheet width is wider than the width of the two reinforcing fiber base sheets paralleled, are supplied, and stopped.

Figure 17:
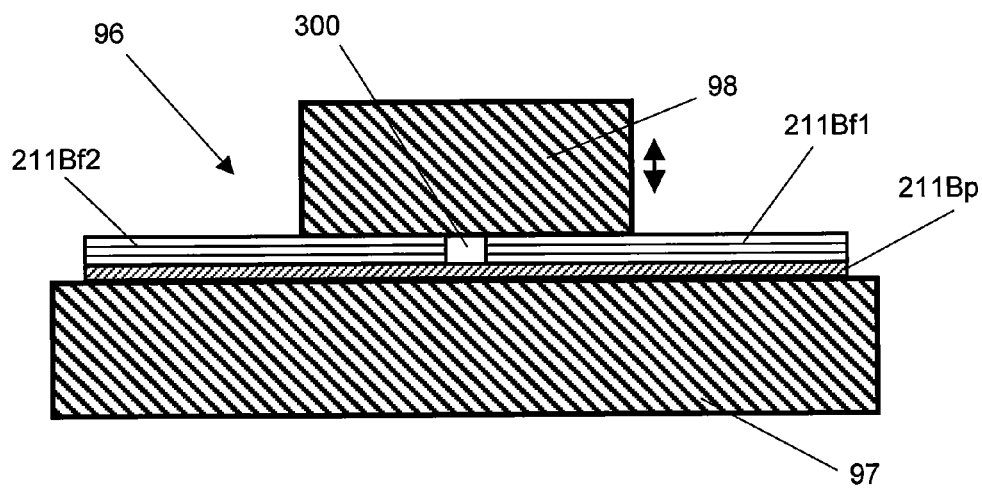
FIG. 17 is a schematic front view of an example of a release sheet bonding apparatus for explaining an embodiment in which, by using the release sheet bonding apparatus shown in FIG. 15, in a state where two of right and left reinforcing fiber bases are placed apart from each other on a commonly used release sheet, the bottoms of respective reinforcing fiber bases are bonded and integrated to upper surface of the release sheet.

State of the cross-section of lengthwise direction on that occasion is explained by using FIG. 17, for a case in which the release sheet bonding apparatus 96 of FIG. 15 is used as a release sheet bonding apparatus. Two reinforcing fiber base sheets 211Bf1 and 211Bf2 are placed on a broad release sheet 211Bp with a gap 300. After that, a mold of the release sheet bonding apparatus 204B (the release sheet bonding apparatus 96 of FIG. 15) is closed in this condition, and under heat and pressure, one release sheet 211Bp is bonded and integrated to the lower surface of the reinforcing fiber base sheets 211Bf1 and 211Bf2.

At this time, in FIG. 17, the flat portion of protrusion 98a of the top mold 98 can, since it presses the two reinforcing fiber base sheets 211Bf1 and 211Bf2 only in a portion which does not become a bent portion but become a web portion in a later step, prevent a wrinkle being generated in a shaping apparatus when the bent portion is given.

Furthermore, it is better that a width of the gap 300 in FIG. 17 is set into a width made by adding thicknesses of the reinforcing fiber base sheets 211Bf1 and 211Bf2. The "thickness" here means thickness when volume fraction Vpf of reinforcing fiber of the reinforcing fiber base sheet is made into 45 to 65%. In this way, the reinforcing fiber base sheets 211Bf1 and 211Bf2 in which the broad release sheet 211Bp is bonded is folded in a later step as the gap 300 fulcrum and as the release sheet 211Bp outside, and when the portion of the gap 300 becomes the tip portion of the web portion of the T-shaped preform, it is possible to arrange end portions of the two reinforcing fiber base sheets 211Bf1 and 211Bf2 without position difference and firmly.

That is, by the release sheet, since relative position of the two reinforcing fiber base sheets 211Bf1 and 211Bf2 is restrained, the left and right two reinforcing fiber base sheets cannot move relatively and automatically bonded in parallel, and it is possible to produce a preform having high accuracy, in accuracy of reinforcing fiber direction. And, since there is no slackness and tension of the release sheet at the end of the web portion, when it is made into a fiber-reinforced resin beam by injecting and curing matrix resin in a later step, a high quality product having no resin rich or unimpregnated portion at the end of web portion is obtained.

Next, the reinforcing fiber bases 211Bf1 and 211Bf2 to which the release sheet 211Bp is integrated, is supplied to the shaping apparatus 205B and then, stopped there to be shaped into a T-shape by the shaping apparatus 205B under heat and/or pressure. By the intermittent motion of the release sheet bonding apparatus 204B and the shaping apparatus 205B, the T-shaped preform 206B to which the continuous release sheet is integrated such that it covers the T-shape is molded.

Figure 18:
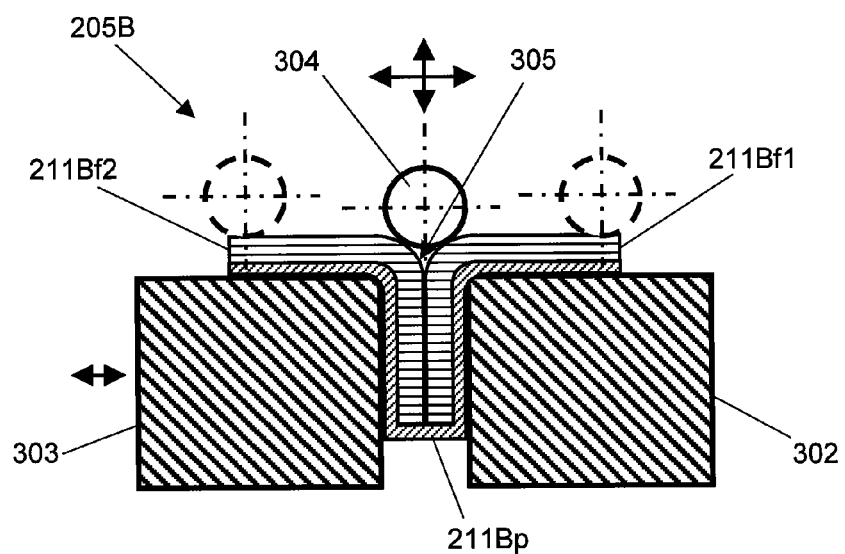
FIG. 18 is a schematic front view of the shaping apparatus 205B shown in FIG. 16.

Here, detail of the shaping apparatus 205B is explained by using FIG. 18 which is a schematic cross sectional view. The shaping apparatus 205B comprises a right side mold 302 fixed to a base stand (omitted in the figure), a left side mold 303 supported by the base stand movably in the horizontal direction and a widening roll 304 supported by the base stand movably in the vertical and horizontal direction. Both of the upper surface of the right side mold 302 and the upper surface of the left side mold 303 are flat and present in the same plane, and both of the left surface of the right side mold 302 and the right surface of the left side mold 303 are flat and in relation of parallel position. In the respective right side mold 302 and left side mold 303, heating means are contained.

Figure 19:
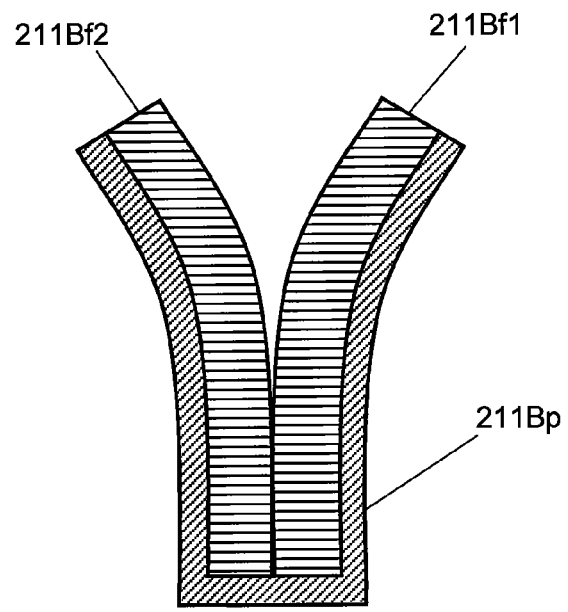
FIG. 19 is a schematic cross sectional view which explains a change of a shape of a reinforcing fiber base integrated with a release sheet in step of moving the reinforcing fiber base integrated with the release sheet in the release sheet bonding apparatus 204B of FIG. 16 (release sheet bonding apparatus 96 of FIG. 17) to the shaping apparatus 205B.

The reinforcing fiber bases 211Bf1 and 211Bf2 having a release sheet formed by the release sheet bonding apparatus 204B, to which the release sheet 211Bp is bonded and integrated, is, in a step of being supplied to the shaping apparatus 205B, folded with the release sheet outside as shown in the schematic cross sectional view of FIG. 19, and in addition, the reinforcing fiber bases near end portions opposite to the folded fulcrum are made into a V-shaped condition spaced apart with each other.

Next, the reinforcing fiber bases 211Bf1 and 211Bf2 having the release sheet to which the release sheet 211Bp is bonded and integrated, which is made into the V-shape, is introduced to the shaping apparatus 205B, and at this time, first, the left side mold 303 moves to the direction of the right side mold 302, and between the right side mold 302 and the left side mold 303, the portion corresponding to the web portion of the T-shape ranging from the folded fulcrum side to near the center is heated and pressed.

Next, the widening roll 304 goes down between the two reinforcing fiber bases 211Bf1 and 211Bf2 and touches down to a concave portion 305 formed by the reinforcing fiber bases 211Bf1 and 211Bf2. Next, the widening roll 304 moves, while adding pressure downward, to the left direction in the figure, up to a lefter side than the end portion of the reinforcing fiber base 211Bf1, and folds the upper portion of the reinforcing fiber base 211Bf1, which is not held with the right side mold 302 and the left side mold 303, to the left direction to form the left web portion of the T-shape.

Next, the widening roll 304 goes up, moves to the right side, goes down again to touch down to the concave portion 305, and while adding pressure downward as previously, to the right side direction in the figure this time, moves up to a righter side than the end portion of the reinforcing fiber base 211Bf2, and folds the upper portion of the reinforcing fiber base 211Bf2, which is not held by the right side mold 302 and the left side mold 303, to the right direction to form the right web portion of the T-shape.

This set of operations of the widening roll 304, in which the upper portions of the reinforcing fiber bases 211Bf1 and 211Bf2 are folded into to left and right respectively, is referred to as widening operation, and by carrying out this widening operation plural times, the bent portion is formed surely in the reinforcing fiber bases 211Bf1 and 211Bf2 without a wrinkle.

The flat-plate preform 206A molded in the molding line 202A is a preshaped object 207A. The T-shaped preform 206B molded in the molding line 202B is a preshaped object 207B.

These preshaped objects 207A and 207B are supplied to a preshaped object bonding apparatus 208 provided in the down stream side of the respective shaping apparatuses. In the preshaped object bonding apparatus 208, the respective preshaped objects is, under heat and/or pressure, at a surface to be bonded of the respective reinforcing fiber base sheets, bonded and integrated by an adhesive resin, to form a preform 212 in an embodiment of the present invention.

Figure 20:
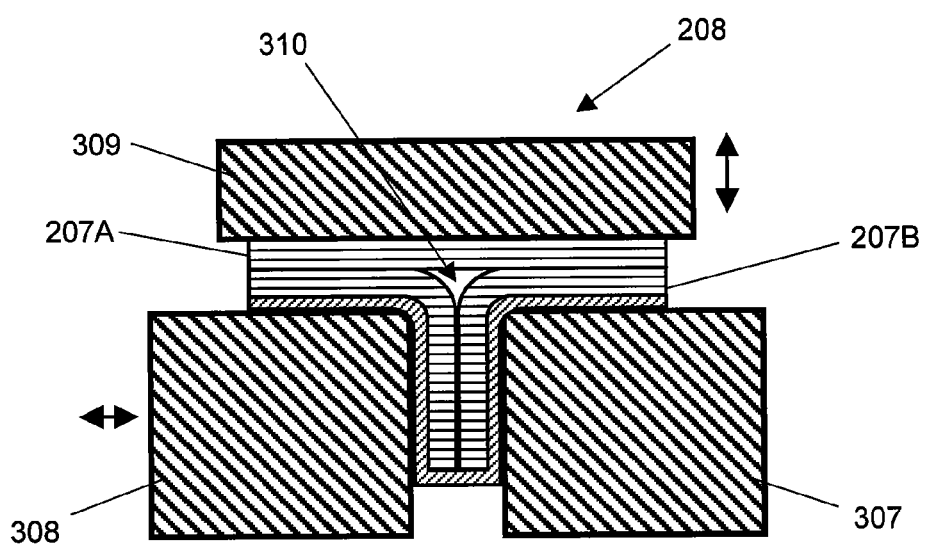
FIG. 20 is a schematic cross sectional view of the preshaped object bonding apparatus 208 shown in FIG. 16.

Here, details of the preshaped object bonding apparatus 208 are explained by using FIG. 20 which is a schematic cross sectional view. The preshaped object bonding apparatus 208 comprises a right side mold 307 fixed to a base stand (omitted in the figure), a left side mold 308 supported movably in the horizontal direction by the base stand, and, a top mold 309 supported movably in the vertical direction by the base stand. Both of the upper surface of the right side mold 307 and the upper surface of the left side mold 308 are present in the same plane and both of the left surface of the right side mold 307 and the right surface of the left side mold 308 are flat and in relation of parallel position. The lower surface of the top mold 309 is in parallel positional relation with the plane of the upper surface of the right side mold 307 and the upper surface of the left side mold 308. In the respective of the right side mold 307, the left side mold 308 and the top mold 309, heating means are contained.

Preshaped objects 207A and 207B are supplied to the preshaped object bonding apparatus 208 and stopped in a state in which the preshaped object 207A having a flat plate shape is placed on the flange portion of the T-shaped preshaped object 207B. Here, at first, the left side mold 308 moves in the direction to the right side mold 307, and the portion corresponding to the web portion of the T-shape is heated and pressed between the right side mold 307 and the left side mold 308. Next, the top mold 309 goes down, and between the top mold 309 and the right side mold 307 and the left side mold 308, by a portion corresponding to the flange portion of the T-shape being heated and pressed, the flat plate preshaped object 207A is bonded and integrated to the T-shaped preshaped object 207B.

The molded preform 212 is intermittently taken up along the preform take-up line 203. The intermittent operation of the respective molding lines and preform take-up line is carried out synchronously with the intermittent taking up of the preform 212. In FIG. 16, an illustration of an apparatus for the intermittent movement of the respective materials in the apparatus for producing the preform 201 is omitted, but since such an apparatus for intermittent movement of the respective materials has conventionally been well known, the well known one can be used.

In the apparatus 201 for producing the preform of FIG. 16, similar to the apparatus for producing the I-shaped preform shown in FIG. 12, a filler feeding line 222 for supplying a filler 221, to fill a gap portion (a gap portion 310 of FIG. 20) formed in a branch portion, to the preshaped object bonding apparatus 208 is also provided. The filler 221 is, along the respective feeding lines, intermittently supplied to the preshaped object bonding apparatus 208.

Like the process for producing the T-shaped preform explained in the above by using FIG. 16, first, to one release sheet, plural reinforcing fiber base sheets are bonded with appropriate gaps, and by producing a predetermined cross-sectional shape preform based on this reinforcing fiber base sheet with release sheet, it is possible to obtain a high quality preform with no difference of relative position of the reinforcing fiber base sheets. And, since the end portion of reinforcing fiber base sheet can also be wrapped by the release sheet, it is possible to obtain a preform excellent in view of surface protection. This method can appropriately be used, not only for a preform of which a cross-sectional shape is T-shaped, but also for a preform of, other than I-shaped, other cross-sectionally shaped beam shown in FIG. 2.

EXAMPLES

Next, examples and a comparative example of the present invention are explained.

Example 1

<Carbon Fiber Cloth>

A unidirectional non-crimp carbon fiber woven fabric having a unit weight of carbon fiber of 190 g/cm² was prepared by using, as a reinforcing fiber yarn, a carbon fiber yarn having a number of filaments of 24,000, a width of 5.4 mm, a tensile strength of 5.8 GPa and a tensile modulus of 290 GPa as warp, a covering yarn in which 22.5 dtex glass fiber yarn deposited with a coupling agent and covered with 17 dtex nylon 66 filament yarn which is subjected to a scouring as auxiliary yarn of the warp, and 17 dtex nylon 66 filament yarn which is subjected to scouring as weft.

As an adhesive resin, a particle comprising thermoplastic resin having an average particle diameter of 120 μm and a glass transition temperature of 70° C. was prepared. This adhesive resin was uniformly scattered to both surface of the above-mentioned unidirectional non-crimp carbon fiber woven fabric. The amount scattered of the adhesive resin was made to 13 g/m² per one surface. The carbon fiber woven fabric on which the adhesive resin was scattered was heated to 200° C. to deposit the adhesive resin scattered on the surface of the carbon fiber woven fabric.

<Carbon Fiber Base Material>

The carbon fiber cloth deposited with the above-mentioned adhesive resin was cut into carbon fiber cloths of width 1,000 mm and length 5,000 mm having angles of fiber direction of 45° direction, 0° direction, −45° direction and 90° direction, and were laminated in turn in the order of 45°/0°/−45°/90°/−45°/0°/45°, to prepare a laminate of the carbon fiber cloths.

This laminate was placed between a heatable flat plate and a heatable bonding device made of an aluminum alloy in which columnar indentors having tip cross-sectional area of 3 mm² are distributed in lengthwise and widthwise directions in pitch of 10 mm on a flat plate, the flat plate and the bonding device were heated to 80° C., to heat the laminate to 80° C. and simultaneously controlled the bonding device such that the pressure per one indentor would be 0.1 MPa to press the laminate at positions corresponding pressing parts of the bonding device, and by the adhesive resin deposited on surface of the carbon fiber cloth, bonded and integrated the carbon fiber cloths with each other at portions corresponding to the positions of pressing parts, to prepare a carbon fiber base material.

Taking 0° direction as lengthwise direction, 2 carbon fiber base material sheets having a size of width 100 mm and length 5,000 mm and 2 carbon fiber base material sheets having a size of width 150 mm and length 5,000 mm were prepared by cutting the above-mentioned carbon fiber base material.

Example 2

<Bonding and Integrating a Release Sheet to a Reinforcing Fiber Base>

2 release sheets of width 100 mm and length 5,000 mm and 2 release sheets of width 150 mm and length 5,000 mm were prepared by cutting a release sheet made of polyester woven fabric of weight 85 g/m² and thickness 0.14 mm (Peel Ply 60001 produced by Richmond Aircraft Products, Inc.).

One of the 2 sheets of the carbon fiber base material of width 100 mm prepared in Example 1 was used as the reinforcing fiber base sheet 142Af shown in FIG. 12, and the other sheet was used as the reinforcing fiber base sheet 142Df. And, one sheet of the carbon fiber base materials of width 150 mm prepared in Example 1 was used as the reinforcing fiber base sheet 142Bf shown in FIG. 12, and the other sheet was used as the reinforcing fiber base sheet 142Cf.

One of the 2 sheets of the release sheet of width 100 mm prepared was used as the release sheet 142Ap shown in FIG. 12, and the other sheet was used as the release sheet 142Dp. And, one of the 2 sheets of the release sheet of width 150 mm prepared was used as the release sheet 142Bp shown in FIG. 12, and the other sheet was used as the release sheet 142Cp.

The release sheet 142Ap and the reinforcing fiber base sheet 142Af were, in the molding line 142A, intermittently supplied to the release sheet bonding apparatus 144A. Synchronously with this intermittent supply, the release sheet 142Dp and the reinforcing fiber base sheet 142Df were, in the molding line 142D, intermittently supplied to the release sheet bonding apparatus 144D.

Furthermore, synchronously with this intermittent supply, the release sheet 142Bp and the reinforcing fiber base sheet 142Bf were, in the molding line 142B, intermittently supplied to the release sheet bonding apparatus 144B. Synchronously with this intermittent supply, the release sheet 142Cp and the reinforcing fiber base sheet 142Cf were, in the molding line 142C, intermittently supplied to the release sheet bonding apparatus 144C.

At the respective release sheet bonding apparatuses, the supplied release sheet and the reinforcing fiber base sheet were bonded and integrated. The heating temperature at this bonding and integration was set to 90° C., and the pressure was set to, 1.0 kg/cm² (0.098 MPa). The heating and the pressing time was set to 2 minutes. By the respective release sheet bonding apparatuses, 4 belt-shaped reinforcing fiber base sheets in which the release sheet was bonded and integrated to one side surface of the reinforcing fiber base sheet were produced.

Since the reinforcing fiber base sheet bonded and integrated with the release sheet produced by the release sheet bonding apparatus 144A of the molding line 142A could be used as a flat-plate preshaped object 146A as it is, use of the shaping apparatus 145A in the molding line 142A was omitted. Similarly, use of the shaping apparatus 145D in the molding line 142D was also omitted.

The reinforcing fiber base sheet bonded and integrated with the release sheet produced by the release sheet bonding apparatus 144B in the molding line 142B was successively supplied to the shaping apparatus 145B. And, the reinforcing fiber base sheet bonded and integrated with the release sheet produced by the release sheet bonding apparatus 144C in the molding line 142C was successively supplied to the shaping apparatus 145C. At the shaping apparatus 145B and the shaping apparatus 145C, the respective reinforcing fiber base sheets bonded and integrated with the release sheets were shaped into a C-shape in cross-sectional shape.

The heating temperature in this shaping was set to 90° C., pressure was set to 1.0 kg/cm$^2$ (0.098 MPa). The heating and pressing time was set to 10 minutes. By the respective shaping apparatus, two preshaped objects 146B and 146C in which the release sheet was bonded and integrated to one side surface of the reinforcing fiber base sheet and a C-shaped in cross-sectional shape were produced.

After the preshaped objects 146A and 146D and the preshaped objects 146B, 146C were produced 600 mm length in lengthwise direction, they were cut and taken out from the molding line, and reinforcing fiber volume fractions Vpf of the each preshaped object (preform) was measured.

Measurement of thickness of the each preshaped object was based on JIS-R-7602 (1995), in which the pressure only was set to 0.1 MPa, and thicknesses of the object was measured at five points and the average thereof was taken as Vpf of the shaped object. Whereas, the thickness subtracted by thickness of the bonded release sheet was taken as the thickness of the each shaped object.

Regarding the position of measurement of thickness of the flat plate shaped objects 146A and 146D, it was measured at the center of width direction and in 100 mm interval in lengthwise direction along the entire length in lengthwise direction. Regarding the position of measurement of thickness of the C-shaped objects 146B and 146C, it was measured at the center of height of the web portion and in 100 mm interval in lengthwise direction along the entire length in lengthwise direction.

As a result, it was found that all of the values of the reinforcing fiber volume fractions Vpf of the preform were within the range of 54.0±0.5%.

The respective flat-plate preshaped objects 146A and 146D, and the C-shaped preshaped objects 146B and 146C were intermittently supplied to the preshaped object bonding apparatus 148.

On the other hand, the carbon fiber cloth used in Example 1 was cut such that 13 carbon fiber yarns were arranged in width direction and folded in width direction, to prepare 2 fillers 161A and 161B. The prepared fillers 161A and 161B were intermittently supplied, via the filler feeding lines 162A and 162B, to the preshaped object bonding apparatus 148.

At the preshaped object bonding apparatus 148, after stopping supply of the respective preshaped objects and the respective fillers, each mold of the preshaped object bonding apparatus 148 was closed, and under heat and pressure, integration of the respective preshaped objects and the respective fillers were carried out. The heating temperature of this integration was set to 90° C., and the pressure was set to 0.3 kg/cm$^2$ (0.0294 MPa). The heating and pressing time was set to 10 minutes. By this procedure, a preform 152 in an embodiment of the present invention which is I-shaped in cross-sectional shape in which the release sheet is bonded and integrated to the entire surface of the reinforcing fiber base sheet was produced.

Reinforcing-fiber volume fractions Vpf of the web portion of the I-shaped preform 152 produced was measured in 100 mm interval along the entire length in lengthwise direction. In all the positions measured, the reinforcing fiber volume fractions Vpf were within the range of 54.0±0.5%.

In addition, on the surface of the I-shaped preform 152, no defect such as a wrinkle was observed and it was found to be a high quality preform.

Furthermore, since the release sheet was bonded and integrated on surface, handling property of the preform was good and no defect on the surface such as fuzz was found. This preform 152 produced was cut into 1,000 mm in its lengthwise direction to prepare a preform for molding a fiber-reinforced resin beam.

Example 3

A fiber-reinforced resin beam was produced from the preform for molding a fiber-reinforced resin beam prepared in Example 2, by using the same molding apparatus shown in FIG. 3.

In this production, after a matrix resin was injected and impregnated to the preform, it was heated at heating temperature of 130° C. for heating time of 2 hours, to precure the matrix resin. After completing the precure of matrix resin, bagging film and each mold or the like were removed, and demolded. The obtained fiber-reinforced resin beam was heated at a heating temperature of 180° C. for a heating time of 2 hours to carry out postcure of the matrix resin, to complete the molding.

As a result of inspecting outer surface of the produced fiber-reinforced resin beam, no defect such as a wrinkle or a resin rich was found. By measuring thicknesses of the flange portion and web portion of this fiber-reinforced resin beam in 100 mm interval in the lengthwise direction, the reinforcing fiber volume fraction Vf was measured. It was found that all measured results of the reinforcing fiber volume fraction Vf were within the range of 57.5±2.5%.

In addition, the beam was cut in direction perpendicular to the lengthwise direction and the cross-section was inspected, but no resin rich portion in corner portion near the branch portion was found.

Comparative Example 1

Preforms were produced in the same way as Example 1 and Example 2, except not using the release sheet. That is, this preform is a conventional preform on which surface no release sheet is bonded and integrated.

In a mold of molding apparatus, on surface of this conventional preform, a release sheet made of polyester woven fabric of weight 85 g/m$^2$ and thickness 0.14 mm (Peel Ply 60001 produced by Richmond Aircraft Products, Inc.) was arranged as a release sheet, to prepare for a molding. However, while arranging the respective materials in the molding apparatus, there arose a problem that the release sheet moved and wrinkled, and could not be fit closely to the corner of branch portion.

Under this condition, a molding of a fiber-reinforced resin beam was carried out in the same way as Example 3. As a result of inspecting outer surface of the fiber-reinforced resin beam produced, a defect of rich or poor of resin was found along the lengthwise direction of the corner near the branch portion. As a result of measuring reinforcing fiber volume fraction Vf of the fiber-reinforced resin beam produced, a portion was found of which reinforcing fiber volume fraction Vf of the web portion is less than 55.0%.

Furthermore, as a result of inspecting a cross-sectional cut surface in the same way as Example 3, a rich or poor of resin in corner near the branch portion was found.

According to an embodiment of the present invention, a preform in which a release sheet is bonded and integrated by an adhesive resin to a surface of a dry reinforcing fiber base is provided. By using this preform in resin transfer molding method, work for separately arranging each release sheet in a mold is greatly reduced, and in addition, since the release sheet is tightly bonded and integrated along the shape of preform, a generation of a resin rich portion which has conventionally been generated in a gap between the release sheet and the preform is prevented.

As a result, a fiber-reinforced resin beam molded by using the preform in an embodiment of the present invention has a good quality. This fiber-reinforced resin beam is, for example, preferably used as various structural members for car or various, structural members for aircraft (for example, stringer or spar).

The invention claimed is:

1. A preform for molding a fiber-reinforced resin beam comprising a reinforcing fiber beam which is formed from a reinforcing fiber base comprising many reinforcing fibers and has a cross-sectional shape comprising at least one linear portion and at least one bent portion connected to said linear portion, and a release sheet bonded and integrated by an adhesive resin to at least a part of a surface of said reinforcing fiber base along the lengthwise direction of said reinforcing fiber base, wherein said reinforcing fiber base has matrix-resin-receiving spaces therein and said preform has a matrix-resin-flowing part connected to said matrix-resin-receiving spaces on at least a part of a surface of said preform, and wherein said part of a surface of said reinforcing fiber base is an inner curved surface of said bent portion of said reinforcing fiber base.

2. The preform for molding a fiber-reinforced resin beam according to claim 1, wherein said release sheet is provided on the surfaces except end surfaces of a thickness direction of said reinforcing fiber base, or on the entire surface including the end surfaces, and wherein said release sheet has the matrix-resin-flowingpart connected to said matrix-resin-receiving spaces of said reinforcing fiber base.

3. The preform for molding a fiber-reinforced resin beam according to claim 1, wherein a volume fraction Vpf of said reinforcing fiber in said preform for molding a fiber-reinforced resin beam is 45 to 65%.

4. The preform for molding a fiber-reinforced resin beam according to claim 1, wherein said reinforcing fiber base is made of a reinforcing fiber cloth.

5. The preform for molding a fiber-reinforced resin beam according to claim 4, wherein said reinforcing fiber base is made of a laminate of a plurality of reinforcing fiber cloths bonded with each other by an adhesive resin.

6. The preform for molding a fiber-reinforced resin beam according to claim 5, wherein said reinforcing fiber base has a ply drop portion in which number of plies of said reinforcing fiber cloth decreases.

7. The preform for molding a fiber-reinforced resin beam according to claim 1, wherein a height in cross-sectional shape of said reinforcing fiber beam varies along its lengthwise direction.

8. The preform for molding a fiber-reinforced resin beam according to claim 1, wherein said release sheet is made of a polyester fiber cloth.

9. The preform for molding a fiber-reinforced resin beam according to claim 1, wherein said reinforcing fiber beam has at least two bent portions and by positioning these two bent portions back-to-back with each other, a branch portion of said reinforcing fiber base is formed in the cross-sectional shape of said reinforcing fiber beam.

10. The preform for molding a fiber-reinforced resin beam according to claim 9, wherein the cross-sectional shape of said reinforcing fiber beam is T-shaped, I-shaped, H-shaped or J-shaped.

11. The preform for molding a fiber-reinforced resin beam according to claim 1, wherein said reinforcing fiber base is made of a reinforcing fiber cloth and said reinforcing fiber beam has at least two bent portions, and by positioning these two bent portions back-to-back with each other, a branch portion of said reinforcing fiber base is formed in cross-sectional shape of said reinforcing fiber beam, and said release sheet is provided on one part of a surface of said reinforcing fiber base, and the other part of the surface of said reinforcing fiber base is exposed on a surface of said preform.

12. The preform for molding a fiber-reinforced resin beam according to claim 1, wherein said reinforcing fiber base is made of a reinforcing fiber cloth, and said reinforcing fiber beam has at least two bent portions, and a branch portion of said reinforcing fiber base is formed in cross-sectional shape of said reinforcing fiber beam by positioning these two bent portions back-to-back with each other, and said release sheet is provided on the surfaces except end surfaces of a thickness direction of said reinforcing fiber base, or on the entire surface including the end surfaces.

13. The preform for molding a fiber-reinforced resin beam according to claim 1, wherein the cross-sectional shape of said reinforcing fiber beam is L-shaped, Z-shaped, C-shaped or hat-shaped.

* * * * *